(12) United States Patent
Steenstrup et al.

(10) Patent No.: US 11,846,705 B2
(45) Date of Patent: *Dec. 19, 2023

(54) MULTIMISSION AND MULTISPECTRAL SONAR

(71) Applicant: R2SONIC, LLC, Austin, TX (US)

(72) Inventors: Jens Steenstrup, Austin, TX (US); Christopher Tiemann, Austin, TX (US); Mark Chun, Austin, TX (US); Kirk Hobart, Austin, TX (US)

(73) Assignee: R3 VOX LTD

( * ) Notice: Subject to any disclaimer, the term of this patent is extended or adjusted under 35 U.S.C. 154(b) by 75 days.

This patent is subject to a terminal disclaimer.

(21) Appl. No.: 17/375,108

(22) Filed: Jul. 14, 2021

(65) Prior Publication Data

US 2021/0341601 A1    Nov. 4, 2021

Related U.S. Application Data

(63) Continuation of application No. 17/359,511, filed on Jun. 26, 2021, which is a continuation of application No. 16/158,551, filed on Oct. 12, 2018, now Pat. No. 11,079,490, which is a continuation of application No. 15/476,137, filed on Mar. 31, 2017, now Pat. No. 10,132,924.

(60) Provisional application No. 62/329,631, filed on Apr. 29, 2016.

(51) Int. Cl.
*G01S 15/00* (2020.01)
*G01S 15/89* (2006.01)
*G10K 11/34* (2006.01)
*G01S 7/52* (2006.01)
*G01S 7/534* (2006.01)
*G01S 15/32* (2006.01)
*G01S 15/58* (2006.01)
*G10K 11/00* (2006.01)
*G01S 7/533* (2006.01)

(52) U.S. Cl.
CPC ...... *G01S 15/8902* (2013.01); *G01S 7/52003* (2013.01); *G01S 7/533* (2013.01); *G01S 7/534* (2013.01); *G01S 15/32* (2013.01); *G01S 15/325* (2013.01); *G01S 15/586* (2013.01); *G01S 15/89* (2013.01); *G10K 11/008* (2013.01); *G10K 11/346* (2013.01)

(58) Field of Classification Search
USPC .................................................. 367/87
See application file for complete search history.

(56) References Cited

U.S. PATENT DOCUMENTS

| | | |
|---|---|---|
| 3,114,631 A | 12/1963 | Sistare |
| 3,144,631 A | 8/1964 | Lustig et al. |
| 3,441,904 A | 4/1969 | Wilson |
| 3,492,634 A | 1/1970 | Massa |
| 3,603,920 A | 9/1971 | Stedfnitz |
| 3,618,006 A | 11/1971 | Wright |
| 3,964,014 A | 6/1976 | Tehon |
| 4,156,863 A | 5/1979 | Madison |
| 4,307,613 A | 12/1981 | Fox |
| 4,864,179 A | 9/1989 | Lapetina |

(Continued)

*Primary Examiner* — James R Hulka
(74) *Attorney, Agent, or Firm* — Paul D. Chancellor; Ocean Law

(57) ABSTRACT

A survey system including a transmitter, receiver, projector array and hydrophone array transmits and receives sound waves to perform one or more survey missions.

22 Claims, 16 Drawing Sheets

(56) References Cited

U.S. PATENT DOCUMENTS

| | | | | |
|---|---|---|---|---|
| 4,953,143 | A * | 8/1990 | Higgins | G01S 15/102 367/88 |
| 5,329,498 | A | 7/1994 | Greenstein | |
| 5,377,163 | A * | 12/1994 | Simpson | G01S 15/96 367/87 |
| 5,422,860 | A * | 6/1995 | Bradley | G01S 15/58 367/89 |
| 5,426,619 | A | 6/1995 | Madden | |
| 5,483,499 | A | 1/1996 | Brumley et al. | |
| 5,488,956 | A | 2/1996 | Bartelt | |
| 5,694,372 | A | 12/1997 | Perennes | |
| 5,808,967 | A * | 9/1998 | Yu | G10K 11/341 367/91 |
| 6,285,628 | B1 | 9/2001 | Kiesel | |
| 6,714,482 | B2 | 3/2004 | Rowe | |
| 7,092,440 | B1 | 8/2006 | Dress, Jr. et al. | |
| 7,355,924 | B2 | 4/2008 | Zimmerman | |
| 7,929,375 | B2 * | 4/2011 | Nuttall | G01S 15/101 367/100 |
| 8,130,592 | B2 * | 3/2012 | Scoca | G01S 13/605 367/89 |
| 8,220,408 | B2 | 7/2012 | Stone | |
| 8,248,298 | B2 | 8/2012 | Lalezari | |
| 8,305,841 | B2 | 11/2012 | Riordan et al. | |
| 8,514,658 | B2 | 8/2013 | Maguire | |
| 8,625,392 | B2 | 1/2014 | Brumley | |
| 9,091,790 | B2 | 7/2015 | Caute | |
| 9,192,353 | B2 | 11/2015 | Bandy | |
| 9,214,149 | B2 | 12/2015 | Barnard | |
| 9,223,022 | B2 | 12/2015 | Coleman | |
| 9,244,168 | B2 | 1/2016 | Proctor | |
| 9,268,020 | B2 * | 2/2016 | Coleman | G01S 7/521 |
| 9,354,312 | B2 | 5/2016 | Proctor | |
| 9,384,447 | B2 * | 7/2016 | Forero | G06F 17/14 |
| 9,541,643 | B2 | 1/2017 | Maguire | |
| 9,772,416 | B2 | 9/2017 | Caute | |
| 9,772,417 | B2 | 9/2017 | Caute | |
| 9,817,116 | B1 * | 11/2017 | Steenstrup | G01S 15/60 |
| 9,817,117 | B1 * | 11/2017 | Steenstrup | G01S 15/89 |
| 10,067,228 | B1 * | 9/2018 | Steenstrup | G01S 7/521 |
| 10,094,924 | B2 * | 10/2018 | Steenstrup | G01S 7/534 |
| 10,132,924 | B2 * | 11/2018 | Steenstrup | G01S 15/586 |
| 10,429,505 | B2 * | 10/2019 | Steenstrup | G01S 7/53 |
| 10,605,914 | B2 * | 3/2020 | Steenstrup | G01S 7/534 |
| 11,054,521 | B2 * | 7/2021 | Steenstrup | G01S 7/521 |
| 11,079,490 | B2 * | 8/2021 | Steenstrup | G10K 11/008 |
| 11,428,810 | B2 * | 8/2022 | Steenstrup | G01S 15/89 |
| 2002/0126577 | A1 | 9/2002 | Borchardt | |
| 2003/0076742 | A1 * | 4/2003 | Rowe | G01F 1/002 367/89 |
| 2003/0235112 | A1 | 12/2003 | Zimmerman | |
| 2004/0037166 | A1 * | 2/2004 | Handa | G10K 11/341 367/103 |
| 2005/0128873 | A1 * | 6/2005 | LaBry | G01V 1/48 367/35 |
| 2007/0159922 | A1 | 7/2007 | Zimmerman | |
| 2009/0257312 | A1 | 10/2009 | Novick | |
| 2010/0141527 | A1 * | 6/2010 | Lalezari | H01Q 21/08 342/368 |
| 2010/0157736 | A1 | 6/2010 | Riordan | |
| 2010/0302907 | A1 | 12/2010 | Brumley | |
| 2010/0331689 | A1 * | 12/2010 | Wegener | G01S 7/52034 600/443 |
| 2011/0007606 | A1 | 1/2011 | Curtis | |
| 2011/0182146 | A1 | 7/2011 | Scoca | |
| 2011/0202278 | A1 | 8/2011 | Caute et al. | |
| 2011/0237951 | A1 * | 9/2011 | Bandy | G10K 11/346 367/137 |
| 2012/0106300 | A1 | 5/2012 | Maguire | |
| 2013/0021876 | A1 | 1/2013 | Maguire | |
| 2013/0033969 | A1 * | 2/2013 | Barnard | G01S 1/72 367/149 |
| 2013/0170320 | A1 * | 7/2013 | Brumley | G01S 5/22 367/127 |
| 2013/0208568 | A1 | 8/2013 | Coleman | |
| 2014/0010048 | A1 | 1/2014 | Proctor | |
| 2015/0253425 | A1 * | 9/2015 | Coleman | G01S 7/52 367/87 |
| 2015/0331104 | A1 | 11/2015 | Proctor | |
| 2015/0346321 | A1 * | 12/2015 | Jansen | G01S 7/02 342/107 |
| 2016/0011326 | A1 | 1/2016 | Caute | |
| 2016/0216392 | A1 | 7/2016 | Caute | |
| 2017/0059706 | A1 * | 3/2017 | Burlet | G01S 7/52004 |
| 2017/0315234 | A1 * | 11/2017 | Steenstrup | G01S 7/282 |
| 2017/0315235 | A1 * | 11/2017 | Steenstrup | G01S 7/534 |
| 2017/0315236 | A1 * | 11/2017 | Steenstrup | G01S 15/8902 |
| 2017/0315237 | A1 * | 11/2017 | Steenstrup | G10K 11/008 |
| 2017/0350978 | A1 * | 12/2017 | Williamson | G01S 15/89 |
| 2018/0067208 | A1 * | 3/2018 | Steenstrup | G01S 15/582 |
| 2018/0136329 | A1 * | 5/2018 | Steenstrup | G01S 15/586 |
| 2019/0004174 | A1 * | 1/2019 | Steenstrup | G01S 7/54 |
| 2019/0011553 | A1 * | 1/2019 | Steenstrup | G01S 15/325 |
| 2019/0079185 | A1 * | 3/2019 | Steenstrup | G06F 18/00 |
| 2019/0154827 | A1 * | 5/2019 | Steenstrup | G01S 7/533 |
| 2020/0264304 | A1 * | 8/2020 | Steenstrup | G10K 11/008 |
| 2021/0286074 | A1 * | 9/2021 | Steenstrup | G01S 7/521 |
| 2021/0325533 | A1 * | 10/2021 | Steenstrup | G01S 15/89 |

\* cited by examiner

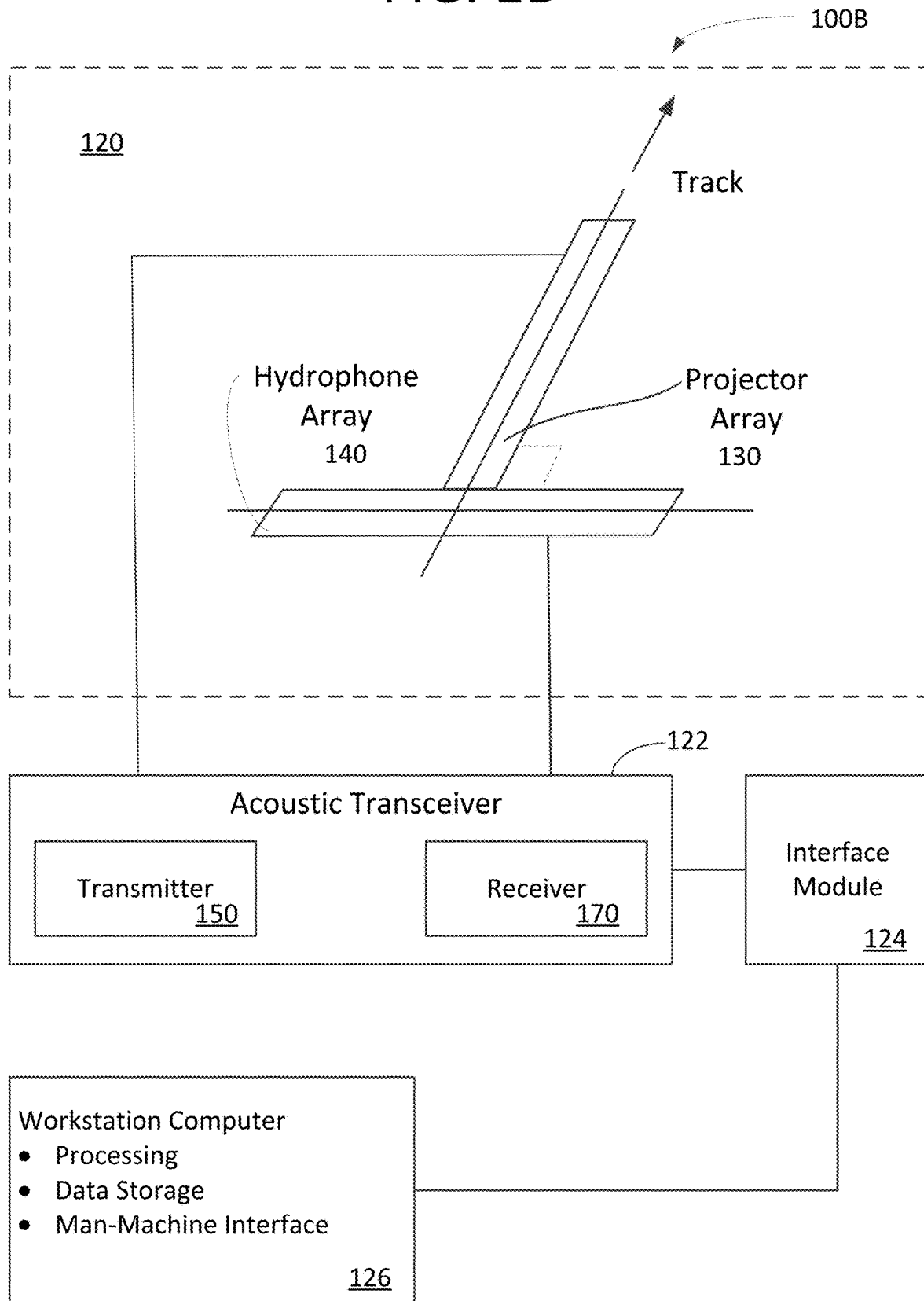

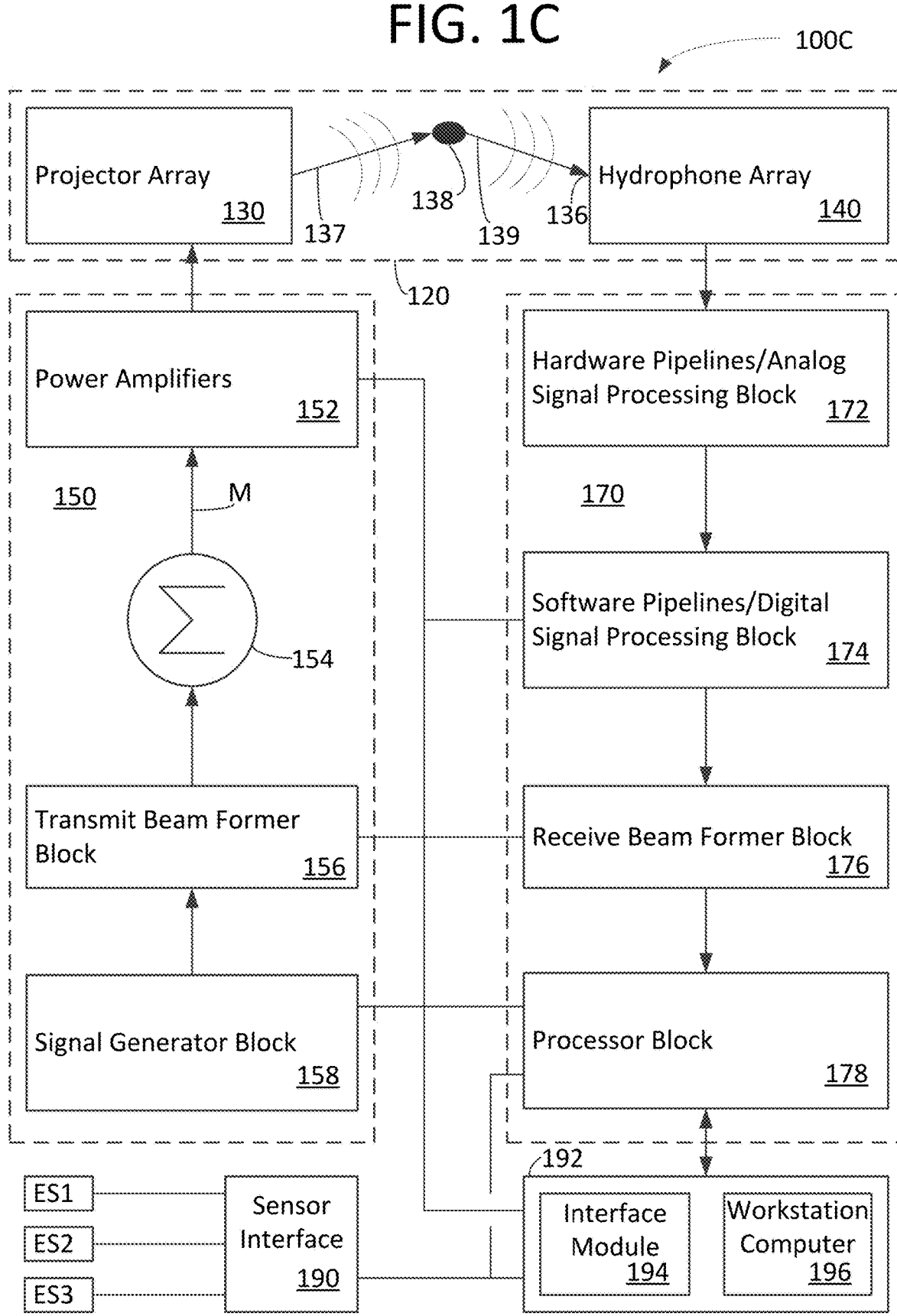

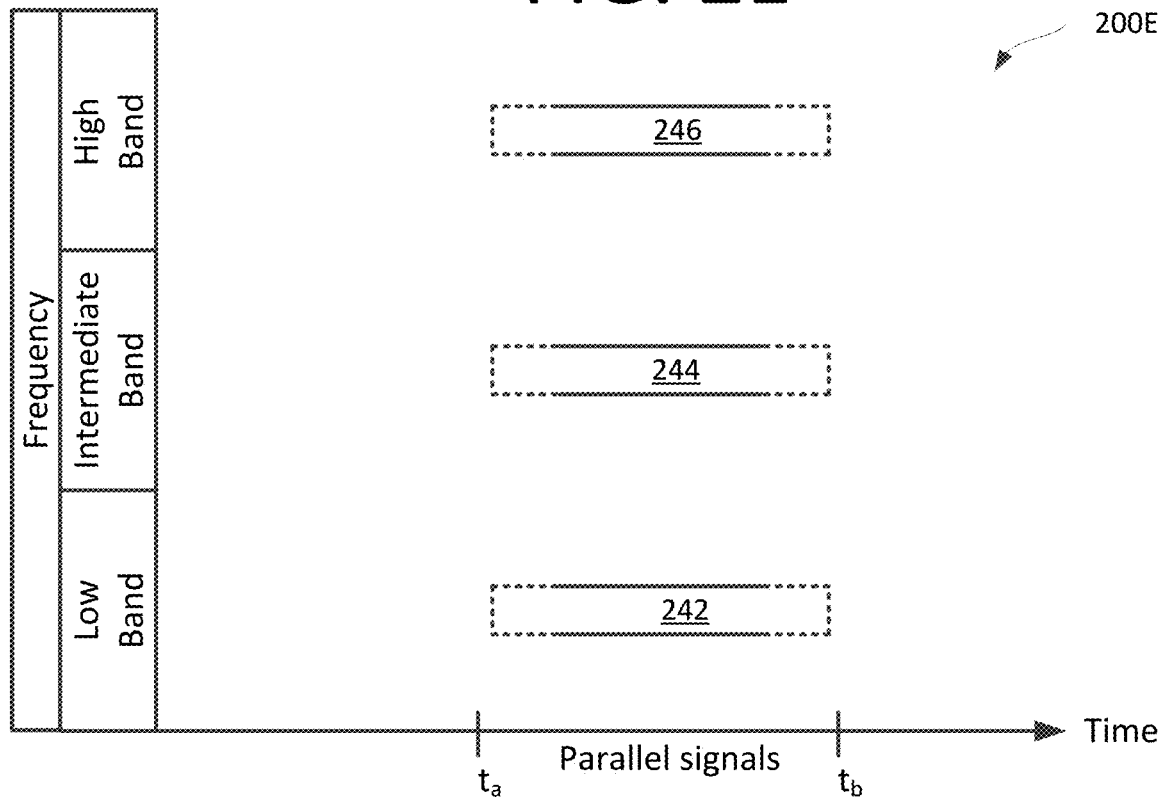

| MISSION | SIGNAL TYPE | | | | | |
|---|---|---|---|---|---|---|
| | CW | FM | OSS | PC | PT | LPI |
| 1) Bathymetry | X | X | X | X | X | X |
| 2) Bottom Classification and/or Segmentation | X | X | | | | |
| 3) Imaging | X | X | X | X | | |
| 4) Water Column | X | X | X | X | | |
| 5) Doppler | X | | | X | | |
| 6) Forward-Looking | X | X | X | X | X | X |
| 7) Sub-Bottom Profiling | X | X | | X | X | |

FIG. 5

| Multi-Mission Surveys | MULTI-MISSION MESSAGE CONTENT | | | MESSAGE CONSTRUCTION | | |
|---|---|---|---|---|---|---|
| | Low Band -higher range/ penetration -less angular resolution | Intermediate Band(s) | High Band -lower range -more angular resolution | Single Ping | | Multi Ping |
| | | | | Serial | Parallel | |
| 1) Bathymetry Long Swath/Low Angular Res. + Bathymetry Short Swath/High Angular Res. | CW, FM | No | CW, FM | X | X | X |
| 2) Seafloor Characterization Low Band + Seafloor Characterization High Band | CW | Yes | CW | | X | X |
| 3) Seafloor Characterization + Bathymetry | CW | Yes | FM | X | X | X |
| 4) Doppler Navigation + Multi-fan Bathymetry | PC | No | OSS | X | | X |
| 5) Sub Bottom Profiling + Bathymetry | CW | Yes | CW | | X | X |
| 6) Water Column + Water Column | CW, FM | Yes | CW, FM | X | X | X |
| 7) Water Column + Bathymetry | CW, FM | Yes | CW, FM | X | X | X |

500

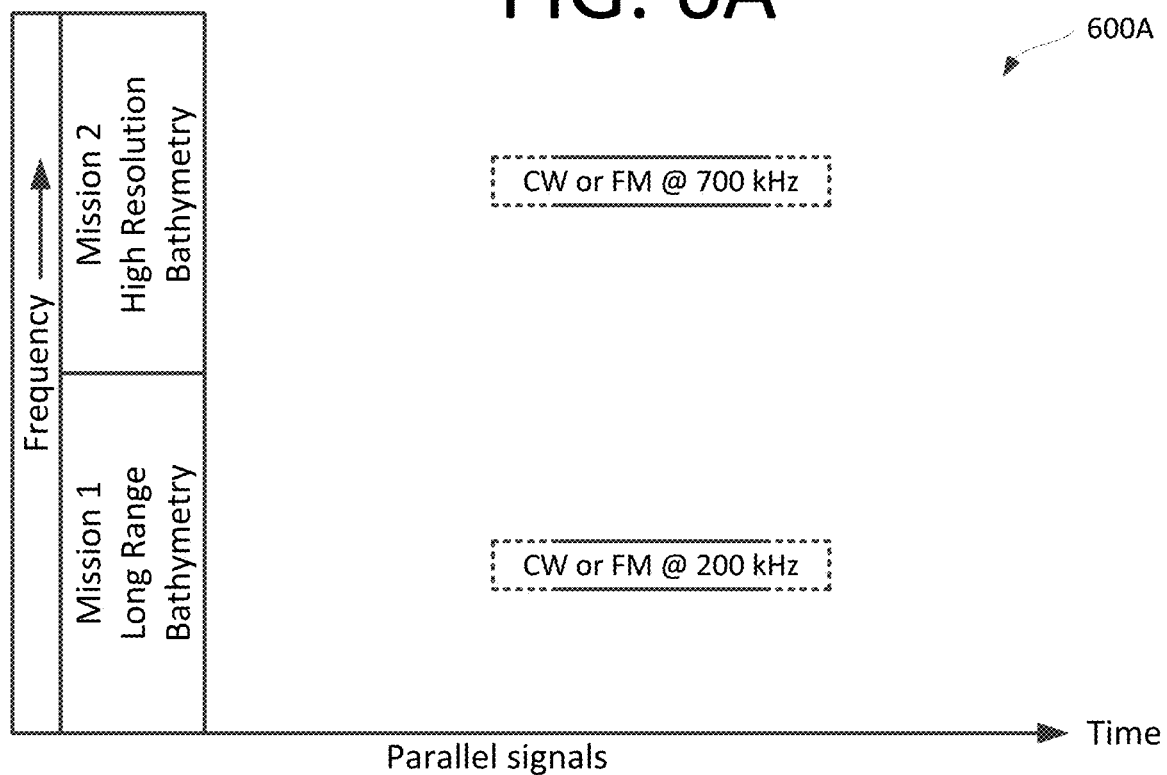
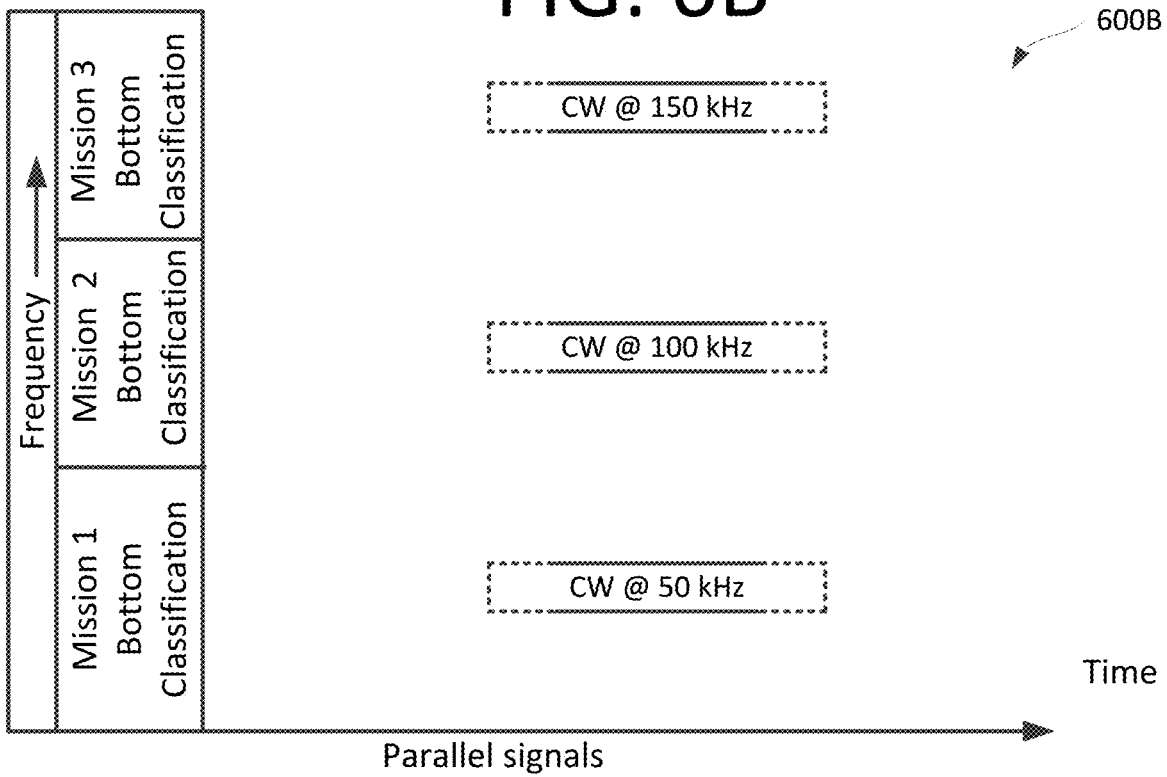

MULTIMISSION AND MULTISPECTRAL SONAR

PRIORITY APPLICATIONS AND INCORPORATION BY REFERENCE

This application is a continuation of U.S. patent application Ser. No. 17/359,511 filed Jun. 26, 2021 which is a continuation of U.S. patent application Ser. No. 16/158,551 filed Oct. 12, 2018 which is a which is a continuation of U.S. patent application Ser. No. 15/476,137 filed Mar. 31, 2017, now U.S. Pat. No. 10,132,924, which claims the benefit of U.S. Prov. Pat. App. 62/329,631 filed Apr. 29, 2016. This application incorporates by reference, in their entireties and for all purposes, the disclosures of U.S. Pat. No. 3,144,631 concerning Mills Cross sonar, U.S. Pat. No. 8,305,841 concerning sonar used for mapping seafloor topography, U.S. Pat. No. 7,092,440 concerning spread spectrum communications techniques, U.S. Pat. No. 5,483,499 concerning Doppler frequency estimation, and U.S. Pat. No. 9,244,168 concerning frequency burst sonar.

BACKGROUND OF THE INVENTION

Field of the Invention

The present invention relates to underwater acoustical systems, methods for using underwater acoustical systems, and methods for processing and using the data they produce. In particular, the invention relates to survey systems including sonar systems with methods of use that enable multiple survey missions to be carried out simultaneously while using a single array of transmitting transducers and a single array of receiving transducers.

Discussion of the Related Art

A month after the Titanic struck an iceberg in 1912, English meteorologist Lewis Richardson filed a patent at the British Patent Office for an underwater ranging device. Modern day successors to Richardson's invention are often referred to as SONAR (sound navigation and ranging) devices. Among these devices are ones using transducer arrays to project sound or pressure waves through a liquid medium and transducer arrays to receive corresponding echoes from features that scatter and/or reflect impinging waves.

Information about these features and their environment can be derived from the echoes. For example, bathymetric surveys provide information about the depth of scattering centers, water column surveys provide information about scattering centers in the water column, and seafloor characterization surveys provide information about scattering centers at the seafloor surface and below the seafloor surface.

The diversity and quality of the information returned in echoes may be determined in part by the characteristics of the signal used to excite the projector transducers. The cost of obtaining this information is strongly influenced by the timeframe during which manpower and equipment is required to acquire the information.

Although some progress towards improving data quality and diversity while reducing the time required to perform an underwater survey has been made, particularly through the use of multibeam echo sounders, long standing technological challenges and risks associated with building and testing costly new survey equipment present significant obstacles to further similar improvements.

SUMMARY OF THE INVENTION

The present invention provides a survey system including a multibeam echo sounder and/or portions thereof. In an embodiment, the present invention provides a survey system for performing multiple missions per message cycle, the survey system including a multibeam echo sounder system for installation on a water going vehicle, the survey system comprising: an acoustic transceiver for use with one or more transducers in a single projector array and plural transducers in a single hydrophone array; the projector array arranged with respect to the hydrophone array to form a Mills Cross; the transceiver for use with a plurality of N non-overlapping frequency bands having respective bandwidths and center frequencies; the transceiver for synthesizing a transmitter message that incorporates one or more signals from each of the frequency bands, the signals supporting a plurality of missions; and, the message for exciting the projector array such that a swath of a waterbody bottom is ensonified by each of the signals in the message and a message echo from ensonified scattering centers is returned to the hydrophone array; wherein a first of the frequency bands is for supporting a first mission and a second of the frequency bands is for supporting a second mission, the first mission frequency band being widely spaced apart from the second mission frequency band to promote survey system recognition of one or more frequency dependent characteristics of the ensonified scattering centers. Notably, survey data may be collected from ensonification of features in waterbodies in general including any of oceans, seas, bays, fiords, estuaries, lakes, rivers, navigable waterways, canals, and harbors.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIGS. 1B-E show embodiments of at least portions of the multibeam echo sounder system of FIG. 1A.

FIGS. 2B-E show messages including plural signals at different frequencies for use with the system multibeam echo sounder system of FIG. 1A.

FIG. 4 shows a table of survey missions to be performed using the multibeam echo sounder of FIG. 1A.

FIG. 5 shows a table of multimission surveys to be performed using the multibeam echo sounder of FIG. 1A.

FIGS. 6A-G show multimission surveys to be performed using the multibeam echo sounder of FIG. 1A.

DETAILED DESCRIPTION OF THE PREFERRED EMBODIMENTS

The disclosure provided in the following pages describes examples of some embodiments of the invention. The designs, figures, and description are non-limiting examples of the embodiments they disclose. For example, other embodiments of the disclosed device and/or method may or may not include the features described herein. Moreover, described features, advantages or benefits may apply to only certain embodiments of the invention and should not be used to limit the disclosed invention.

As used herein, the term "coupled" includes direct and indirect connections. Moreover, where first and second devices are coupled, intervening devices including active devices may be located therebetween.

FIGS. 1A-E show a survey system including a multibeam echo sounder system and describe multibeam echo sounder embodiments.

Figure 1A:
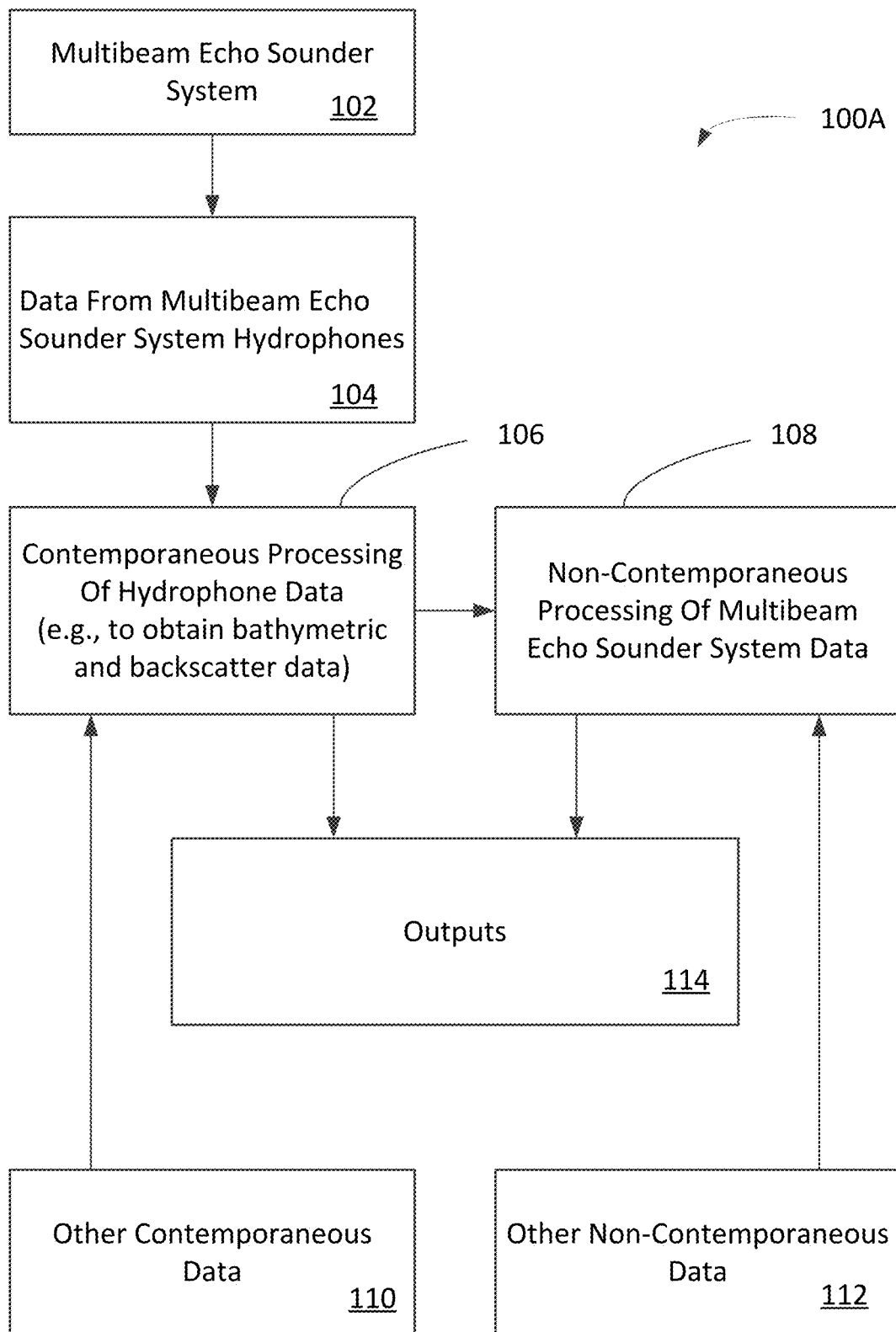
FIG. 1A shows a survey system including a multibeam echo sounder system of the present invention.

FIG. 1A shows a survey system in accordance with an embodiment of the present invention 100A. The survey system includes an echo sounder system such as a multibeam echo sounder system 102 which may be mounted on a surface vehicle or vessel, a remotely operated vehicle, an autonomous underwater vehicle, or the like. As is further described below, echo sounder and/or survey system outputs 114 may be contemporaneous with echo sounder processing of hydrophone data as in some embodiments for bathymetry or non-contemporaneous with processing of hydrophone data as in some embodiments for waterbody bottom classification.

Data acquired by multibeam echo sounder systems 104 includes data from echo sounder listening devices such as hydrophones (e.g., transducers) that receive echoes which are related to the acoustic/pressure waves emanating from the echo sounder projectors but have returned by virtue of an interaction with inhomogeneities of many kinds. The interactions make take the form of reflection or scattering. The inhomogeneities, also known as reflectors and scattering centers, represent discontinuities in the physical properties of the medium. Scattering centers may be found in one or more of i) an ensonified volume of the waterbody such as a water column, upon the ensonified surface of the bottom, or within the ensonified volume of the sub-bottom.

Scattering centers of a biological nature may be present in the water column, as they are a part of the marine life. Scattering centers of a nonbiological nature may be present in the water column in the form of bubbles, dust and sand particles, thermal microstructure, and turbulence of natural or human origin, such as ships' wakes. Scattering centers on the surface of the bottom may either be due to the mechanical roughness of the bottom, such as ripples, or be due to the inherent size, shape and physical arrangement of the bottom constitutes, such as mud, sand, shell fragments, cobbles and boulders, or due to both the two factors. Scattering centers in the sub-bottom may be due to bioturbation of the sediments, layering of different sediment materials within the bottom or buried manmade structures such as pipelines.

Data processing within the echo sounder system may include contemporaneous processing of hydrophone data 106, for example to obtain bathymetric and/or backscatter data. Data processing may also include non-contemporaneous processing of multibeam echo sounder system data 108, for example to characterize bottom conditions or the water column.

Data processing may include utilization of complementary or other data. For example, contemporaneous processing of hydrophone data 106 may utilize contemporaneous 110 and/or non-contemporaneous 112 data such as contemporaneously collected geographic positioning system ("GPS") data, sound speed measurements, attitude, and navigational information. For example, non-contemporaneous processing of echo sounder system data may utilize contemporaneous 110 and/or non-contemporaneous 112 data such as non-contemporaneously collected waterbody bottom composition data and tidal records.

FIG. 1B shows portions of a first multibeam echo sounder system ("MBES") 100B. The echo sounder system includes a transducer section 120 and an acoustic transceiver 122. The echo sounder system may include a transceiver interface such as an interface module 124 and/or a workstation computer 126 for one or more of data processing, data storage, and interfacing man and machine. Here, transducers in a Mills Cross arrangement 120 include a transmitter or projector array 130 and a receiver or hydrophone array 140. Projectors in the projector array may be spaced along a line that is parallel with a keel line or track of a vehicle to which they are mounted which may be referred to as an along track arrangement. In some embodiments, a receiver of the transceiver 122 has an operating frequency ranged matched with that of the projectors and/or the hydrophones.

During echo sounder operation, sound or pressure waves emanating from the projector array travel within a body of water and possibly within the bottom beneath the body of water and in doing so may undergo interactions such as reflections or scattering, which disturb the propagation trajectory of the pressure waves. Some of the reflections or echoes are "heard" by the hydrophone array. See for example the disclosure of Etal, U.S. Pat. No. 3,144,631, which is included herein by reference, in its entirety and for all purposes.

The acoustic transceiver 122 includes a transmitter section 150 and a receiver section 170. The acoustic transceiver may be configured to transmit to a single projector array 130 and to receive from a single hydrophone array 140. In some embodiments, such a transceiver may be said to operate with a single transmitter array and a single receiver array. Unless otherwise noted, the term transceiver does not require common transmitter and receiver packaging.

The echo sounder may further include an interface module such as an interface module 124 for interconnection with the transceiver 122. This interface module may provide, among other things, a power supply for the transceiver, communications with the transceiver, communications with the workstation computer 126, and communications with other sources of data such as a source of contemporaneous GPS data.

The workstation computer 126 may provide for one or more of data processing such as data processing for visualization of survey results, for data storage such as storage of bathymetry data and backscatter data, for user inputs, and for display of any of inputs, system status, and survey results.

FIG. 1C shows portions of a second multibeam echo sounder system ("MBES") 100C. The echo sounder system includes a transducer section 120, a transmitter section 150, and a receiver section 170. Some embodiments include an interface section 190 and/or a management section 192.

The transducer section includes transducers for generating acoustic messages and transducers for receiving acoustic messages. For example, a transducer section may include an array of projectors 130 and an array of hydrophones 140.

Projectors in the projector array may include piezoelectric elements such as ceramic elements which may be stacked or not. Element geometries may include circular and non-circular geometries such as rectangular geometries. Some projectors have an operating frequency range of about 10 kHz to 100 kHz, of about 50 kHz to 550 kHz, or about 100 to 1000 kHz.

Hydrophones in the hydrophone array may include piezoelectric elements such as ceramic elements. Element geometries may include circular and non-circular geometries such as rectangular geometries. Some hydrophones have an operating frequency range of about 10 kHz to 100 kHz, of about 50 kHz to 550 kHz, or about 100 to 1000 kHz.

During operation of the projector array 130 and hydrophone array 140, transmitter section excites the projector array, an outgoing message 137 emanates from the projector array, travels in a liquid medium to a reflector or scattering center 138, is reflected or scattered, after which a return or incoming message 139 travels to the hydrophone array 140 for processing by the receiver 170. Notably, the acoustic/pressure wave input 136 received at the hydrophone array 140 may include a perturbed version of the transmitted message 137 along with spurious signal and/or noise content.

The transmit section 150 may include a signal generator block 158, a transmit beamformer block 156, a summation block 154, and a power amplifier block 152. The transmit section provides for generation of signals 158 that will be used to compose the message 137. Notably, a message may be composed of multiple signals or not. Where a message is composed of multiple signals, the message may contain i) signals in parallel (superposed), ii) signals that are serialized (concatenated), or may be a combination of parallel and serial signals. In an embodiment, plural signals are generated and transmitted at plural different center frequencies $S_{cf1}, S_{cf2} \ldots$.

The transmit beamformer block 156 receives the signal(s) from the signal generator block 158 where beamforming for each signal takes place. The beam(s) are combined in the summation block 154 to construct a parallel, serial, or combination message M. In the power amplifier block 152, the time series voltages of the message are amplified in order to excite or drive the transducers in the projector array 130. In an embodiment, each transducer is driven by a respective amplifier.

The receive section 170 includes multiple hydrophone signal processing pipelines. In an embodiment the receive section includes a hardware pipelines block/analog signal processing block 172, a software pipelines block/digital signal processing block 174, a receive beamformer block 176 and a processor block 178. The receive section provides for isolating and processing the message 137 from the input 136 received at the hydrophone array 140. For example, some embodiments process echoes to determine depths as a function of, among other things, round trip travel times that are based on matching a transmitted message 137 with a corresponding received message isolated from the hydrophone array input 136.

In the hardware pipeline block 172, plural hydrophone array transducers of the hydrophone array 140 provide inputs to plural hardware pipelines that perform signal conditioning and analog-to-digital conversion. In some embodiments, the analog-to-digital conversion is configured for oversampling where the converter Fin (highest input frequency) is less than $F_s/2$ (one half of the converter sampling frequency). In an embodiment, a transceiver 122 operating with a maximum frequency of about 800 kHz utilizes analog-to-digital converters with sampling rates of five MHz.

In the software pipeline block 174, the hardware pipelines 172 provide inputs to the software pipelines. One or more pipelines serve each of the hydrophones in the hydrophone array. Each pipeline provides downconversion and filtering. In various embodiments, the filter provides for recovery of a message from a hydrophone input 136. In an embodiment, each hydrophone is served by plural pipelines for deconstructing a multifrequency message into plural signals at respective center frequencies $S'_{cf1}, S'_{cf2} \ldots$.

In the receive beamforming or steering block 176, the software pipelines 174 provide beamformer inputs. Beamformer functionality includes phase shifting and/or time delay and summation for multiple input signals. In an embodiment, a beamformer is provided for each frequency $S'_{cf1}, S'_{cf2} \ldots$. For example, where software pipelines operate at two frequencies, inputs to a first beamformer are software pipelines operating at the first frequency and inputs to a second beamformer are software pipelines operating at the second frequency.

In the processor block 178, the beamformers of the beamformer block 176 provide processor inputs. Processor functionality includes bottom detection, backscatter processing, data reduction, Doppler processing, acoustic imaging, and generation of a short time series of backscatter sometimes referred to as "snippets."

In an embodiment, a management section 192 and a sensor interface section 190 are provided. The management section includes an interface module 194 and/or a workstation computer 196. The sensor interface section provides for interfacing signals from one or more sensors ES1, ES2, ES3 such as sensors for time (e.g. GPS), motion, attitude, and sound speed.

In various embodiments, control and/or control related signals are exchanged between the management section 192 and one or more of the power amplifier block 152, software pipelines block 174, transmit beamformer block 156, receive beamformer block 176, signal generator block 158, processor block 178. And, in various embodiments sensor interface section data 190 is exchanged with the management section 192 and the processor block 178.

Figure 1D:
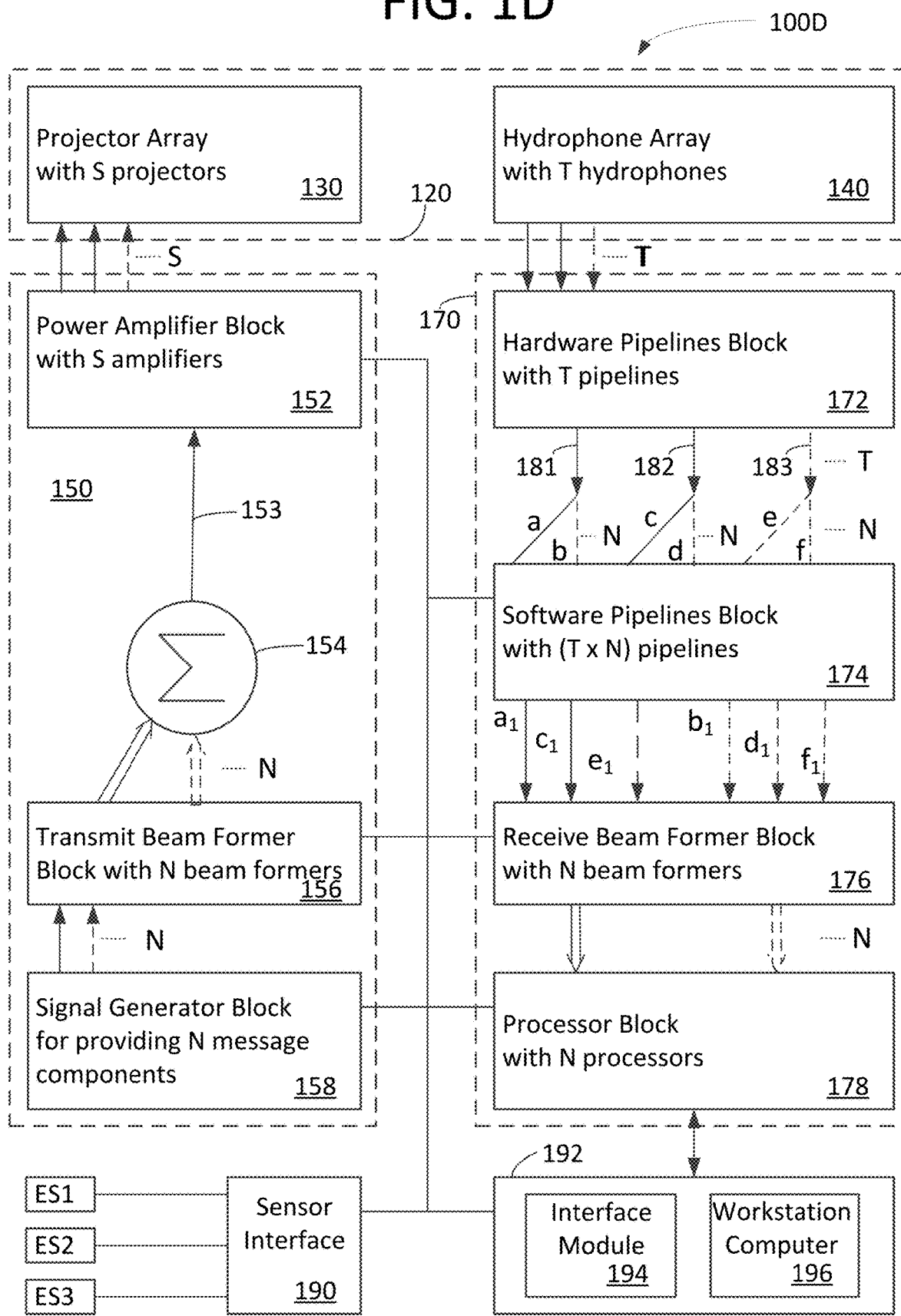

FIG. 1D shows portions of a second multibeam echo sounder system ("MBES") 100D. The echo sounder system includes a transducer section 120, a transmitter section 150, and a receiver section 170. Some embodiments include an interface section 190 and/or a management section 192.

In the embodiment shown, a message 153 incorporating quantity N signals at N respective different center frequencies is used to excite plural projectors in a projector array and a receiver having quantity T hardware or software pipelines and (T×N) hardware or software pipelines may be used to process T hydrophone signals for recovery of echo information specific to each of the N frequencies.

The transmitter section 150 is for exciting the projector array 130. The section includes a signal generator block 158, a transmit beamformer block 156, a summation block 154, and a power amplifier block 152.

The signal generator block 158 generates quantity N signals S1, S2 . . . SN. The signals have center frequencies $cf_1, cf_2 \ldots cf_n$ which may be spaced at intervals of, for example, 50 to 150 kHz. In an embodiment the signals are spaced at intervals of at least 100 kHz.

A transmit beamformer block 156 receives N signal generator block outputs. For each of the N signals generated, the beamformer block produces a group of output beam signals such that there N groups of output beam signals.

The summation block 154 receives and sums the signals in the N groups of output beams to provide a summed output 153.

The power amplifier block 152 includes quantity S amplifiers for driving respective projectors in the projector array

130. Each power amplifier receives the summed output 153, amplifies the signal, and drives a respective projector with the amplified signal.

An array of quantity T hydrophones 140 is for receiving echoes of acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipeline block 172, T pipelines provide independent signal conditioning and analog-to-digital conversion for each of the T hydrophone signals.

In the software pipeline block 174, (T×N) software pipelines provide downconversion and filtering at N frequencies for each of the T hardware pipeline outputs. As shown, each of T hardware pipeline outputs 181, 182, 183 provides N software pipeline inputs a,b and c,d and e,f (i.e., 3×2=6 where T=3 and N=2).

In the receive beamformer block 176, (T×N) software pipeline block 174 outputs are used to form N groups of beams. A beamformer is provided for each of the N frequencies. For example, where there are T=3 hydrophones and software pipelines operate at N=2 frequencies, inputs to a first beamformer are software pipelines operating at the first frequency $a_1$, $c_1$, $e_1$ and inputs to a second beamformer are software pipelines operating at the second frequency $b_1$, $d_1$, $f_1$.

In the processor block 178, N processors receive respective groups of beams formed by the beamformer block 176. Processor block 178 data is exchanged with a management section 192 and sensor interface 190 data ES1, ES2, ES3 is provided to the management section and/or the processor block.

In various embodiments control signals from the management block 192 are used to make power amplifier block 152 settings (e.g., for "S" power amplifiers for shading), to control transmit 156 and receive 176 beamformers, to select software pipeline block 174 operating frequencies, and to set signal generator block 158 operating frequencies.

As the above illustrates, the disclosed echo sounder transmitter may construct a message incorporating signals at N frequencies. And, the echo sounder may utilize a receiver having T hardware pipelines and (T×N) software pipelines to process T hydrophone signals for recovery of echo information specific to each of the N frequencies.

Figure 1E:
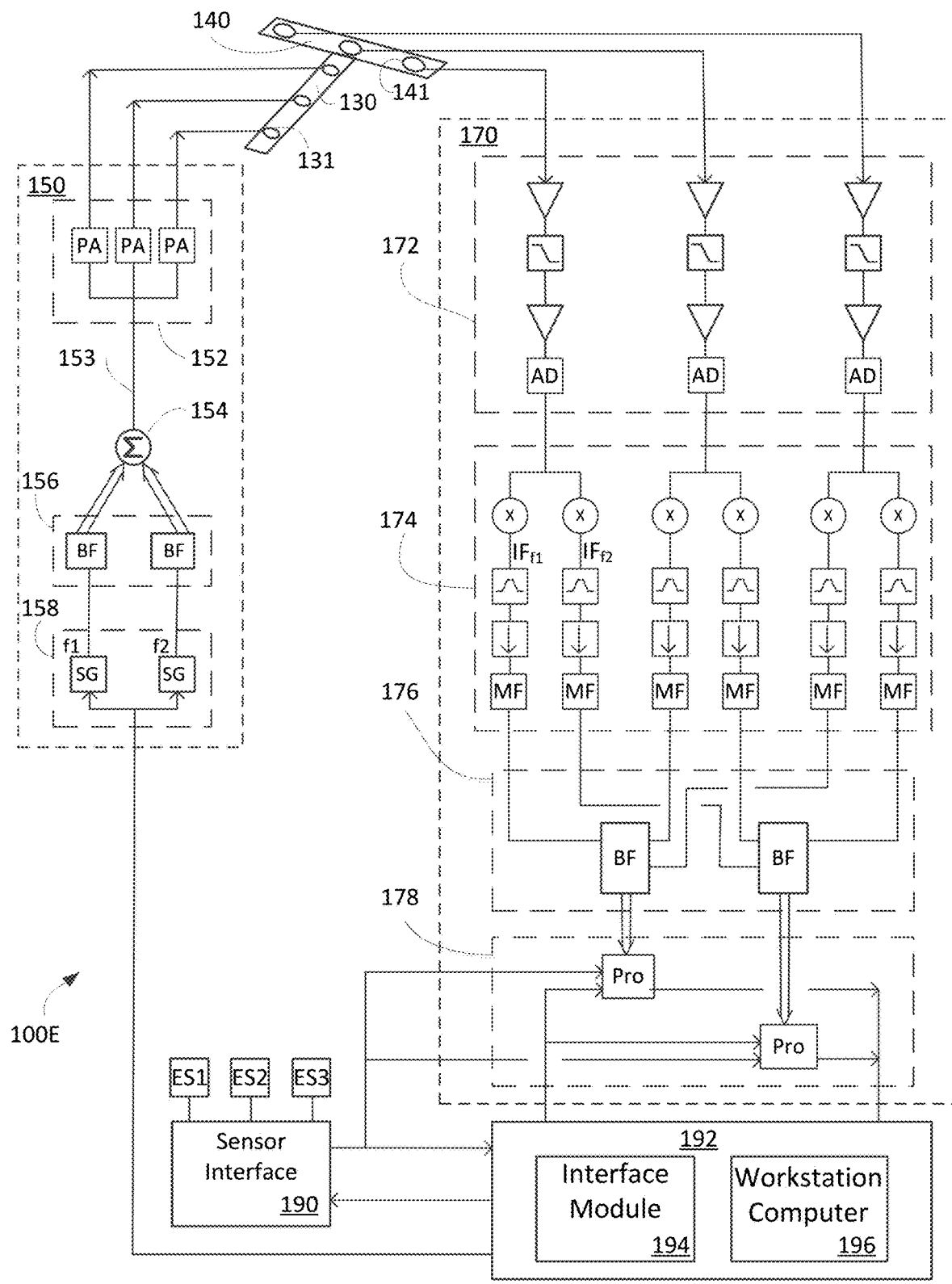

FIG. 1E shows portions of a third multibeam echo sounder system ("MBES") 100E. The echo sounder system includes a transducer section 120, a transmitter section 150, and a receiver section 170. Some embodiments include an interface section 190 and/or a management section 192.

In the embodiment shown, a message 153 incorporating first and second signals $S_{cf1}$, $S_{cf2}$ at first and second different center frequencies N=2 is used to excite three projectors in a projector array, and a receiver having three hardware pipelines and six software pipelines is used to process three hydrophone signals T=3 for recovery of echo information specific to each of the N frequencies.

The transmitter section 150 is for exciting the projector array 130. The section includes a signal generator block 158, a transmit beamformer block, a summation block 154, and a power amplifier block 152.

In the signal generator block 158, N=2 signal generators are shown operating different user selectable center frequencies f1, f2. In respective beamformers of the beamformer block 156, multiple beams are generated from each signal. In a summation block 154, the beams are combined to produce a summation block output signal 153.

The transducer block 120 includes a projector array 130 and a hydrophone array 140 arranged as a Mills Cross. As shown, there are three projectors 131 in the projector array and three hydrophones 141 in the hydrophone array. In the power amplifier block 152, the summed signal or message 153 is an input to power amplifiers driving respective projectors.

Applicant notes that for convenience of illustration, the projector and hydrophone counts are limited to three. As skilled artisans will appreciate, Mills Cross arrays need not have equal numbers of projectors and hydrophones nor do the quantities of either of these transducers need to be limited to three. For example, a modern multibeam echo sounder might utilize 1 to 96 or more projectors and 64 to 256 or more hydrophones.

The array of T=3 hydrophones 141 is for receiving echoes resulting from the acoustic/pressure waves originating from the projector array 130. The resulting hydrophone signals are processed in the receiver section 170 which includes a hardware pipeline block 172, a software pipeline block 174, a receive beamformer block 176, and a processor block 178.

In the hardware pipelines block 172, each of T=3 hardware pipelines processes a respective hydrophone 141 signal through analog components including an analog-to-digital converter. In the embodiment shown, a hardware pipeline provides sequential signal processing through a first amplifier, an anti-aliasing filter such as a low pass anti-aliasing filter, a second amplifier, and an analog-to-digital converter.

In the software pipelines block 174, each of the T=3 hardware pipeline outputs is processed through N=2 software pipelines with downconversion and matched filtering. In the embodiment shown, a software pipeline provides sequential signal processing through a mixer (oscillator is not shown for clarity), a bandpass filter, a decimator, and a matched filter. Communications may occur via communications links between any of the processor block 178, the signal generator block 158, the hardware pipelines block 172, the software pipelines block 174, the and the beamformer block 176. See for example FIGS. 1C-D.

In the receive beamformer block 176, each of N=2 beamformers processes signals. As such, three software pipeline outputs at a first center frequency are processed by a first beamformer and three software pipeline outputs at a second center frequency are processed by a second beamformer. Notably, beamformers may be implemented in hardware or software. For example, multiple beamformers may be implemented in one or more field programmable gate arrays ("FPGA").

In the processor block 178, each of N=2 processors are for processing respective beamformer outputs. Here, a first plurality of beams generated by the first beamformer is processed in a first processor and a second plurality of beams generated by the second beamformer is processed in a second beamformer. Processor outputs interconnect with a management section 192. Notably, one or more processors may be implemented in a single device such as a single digital signal processor ("DSP") or in multiple devices such as multiple digital signal processors.

Complementary data may be provided via a sensor interface section 190 that is interfaced with a plurality of sensors ES1, ES2, ES3. The sensor interface module may provide sensor data to the management section 192 and/or to processors in the processor block 178.

The management section 192 includes a sonar interface 194 and/or a workstation computer 196. In various embodiments control signals from the management block 192 are used for one or more of making power amplifier block 152 settings (e.g., for array shading), controlling transmit 156 and receive 176 beamformers, selecting software pipeline block 174 operating frequencies, setting set signal generator block 158 operating frequencies, and providing processor block 178 operating instructions.

Applicant notes that the echo sounder systems of FIGS. 1C-E may be used to process hydrophone returns from targets i) present within an ensonified volume of the water body, ii) upon an ensonified surface of the bottom, or iii) lying within an ensonified volume of the bottom.

FIGS. 2A-E show a ping cycle and describe multifrequency messages transmitted in the ping cycle.

Figure 2A:
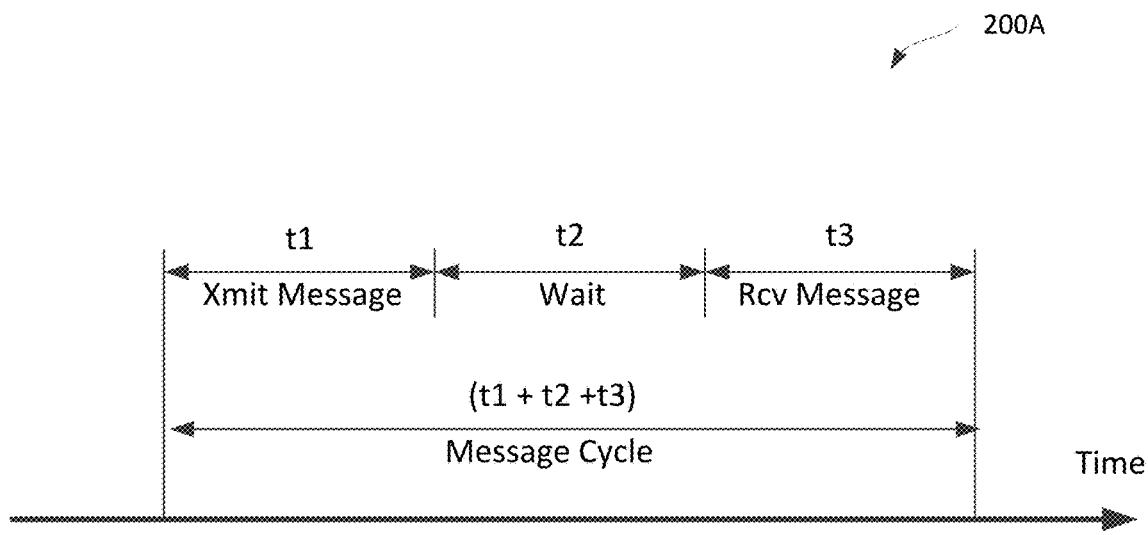
FIG. 2A shows a message cycle for use with the multibeam echo sounder system of FIG. 1A.

FIG. 2A shows a message cycle 200A. The cycle includes a sequence of operations with transmission of a message during a time t1 and reception of a message during a time t3. Transmission of a message refers to the process that excites the projector array 130 and reception of a message refers to the complementary process that interprets the message echo received by the hydrophone array 140. A wait time t2 that varies primarily with range, angle, and sound speed may be interposed between the end of the message transmission and the beginning of the message reception. This wait time may be determined by round trip travel time for the longest sounding range, for example a return from the most distant cell in a swath ensonified by the projector array. In some embodiments, the message transmit length is in a range of 10 to 60 microseconds. In some embodiments, the transmit message length is about 10 milliseconds.

Figure 2B:
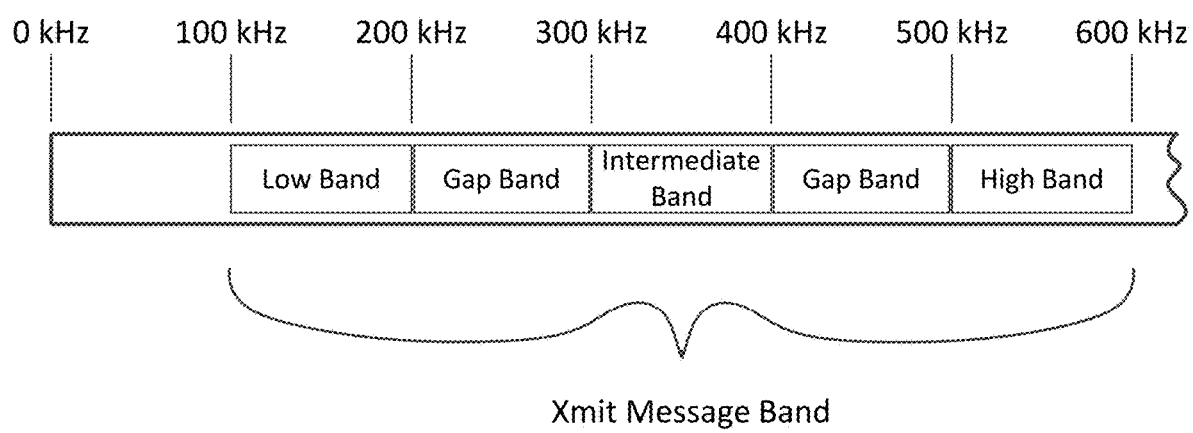

FIG. 2B shows a first multifrequency message 200B. In the embodiment shown, the message includes three signals which may comprise a single or multiple waveforms. A first signal occupies at least a portion of a relatively lower frequency band, for example a band extending from 100 kHz to 200 kHz. A second signal occupies at least a portion of an intermediate band, for example a band extending from 300 kHz to 400 kHz. A third signal occupies at least a portion of a higher band, for example a band extending from 500 kHz to 600 kHz. This message may be referred to as a multifrequency message with signals in widely spaced frequency bands. The frequency bands used by the signals may be referred to as the signal bands wherein a gap band exists between a first signal band and a nearest neighboring second signal band.

Widely spaced frequency bands are contrasted with narrowly spaced and minimally spaced frequency bands. In practice, such frequency bands may be spaced apart just enough to enable separation of signals and/or to prevent interference of the signals. Where signal separation relies on bandpass filters, bandpass filter performance can determine the minimum spacing of frequency bands. For sonar systems operating in the 100 to 400 kHz range, frequency band spacing may be about 1 to 3 kHz, about 3 to 5 kHz, or about 5 to 10 kHz.

Where the same target is ensonified by signals in narrowly spaced frequency bands, for example CW signals, the characteristics of backscatter from a signal in the first band are quite similar to the characteristics of backscatter from a signal in the second band. Here, differences in backscatter characteristics, for example backscatter strength, may be small and/or beyond a range of detection.

Minimizing differences in backscatter characteristics is a desirable result where the surveyor's objective is to increase the along track sounding density. It is also a desirable result where the surveyor's objective is to utilize similar signal ranges and similar signal backscatter strengths to simplify a process of normalizing survey data. However, signals in widely spaced frequency bands do not satisfy these objectives.

Unlike signals in narrowly spaced frequency bands, signals in widely spaced bands may be chosen to elucidate what frequency dependent differences a backscatterer or echo source (e.g., a waterbody bottom) presents.

Further, where backscatterer response is frequency dependent, projector emissions in widely spaced frequency bands may be used to elicit distinguishable backscatter responses. This may be the case even when the echoes are returned from the same scattering areas.

In an embodiment, two frequency bands including respective signals may be widely spaced when they are not narrowly spaced. In an embodiment, two frequency bands including respective signals are widely spaced when they are not narrowly spaced.

In an embodiment, two frequency bands including respective signals are widely spaced when their center frequencies are separated by at least twice the bandwidth of the narrowest of the signals. And, in an embodiment, two frequency bands including respective signals are widely spaced when their center frequencies are separated by at least 30% of the lower of the two center frequencies. In an embodiment, two frequency bands including respective signals are widely spaced when both of these conditions are met.

In an embodiment, two frequency bands including respective signals are widely spaced when a statistically significant difference exists between a message echo portion attributable to the first signal and a message echo portion attributable to the second signal. Echo characteristics which may be evaluated for statistically significant differences include mean backscatter strength, angular response of backscatter strength, and maximum detection range.

In an embodiment, two frequency bands including respective signals are widely spaced when the strength of essentially cotemporaneous backscatter from the signals differs by a prescribed amount. Notably, backscatter strength often increases with frequency while increasing the angle of incidence reduces backscatter strength. In some embodiments, angle average backscatter strength may be compared to indicate whether the frequencies are widely spaced. In some embodiments, backscatter strengths at a particular angle of incidence $\theta$ such as projector angle of incidence are the basis of the above comparison and a difference of about 2 dB or more may indicate that the frequencies are widely spaced. An example follows.

Consider a message comprising signals Sx and Sy in frequency bands Bx and By where Bx is the lower of the two frequency bands. Where backscatter signal strengths BSx and BSy at a common angle of incidence $\theta$ are such that BSy exceeds BSx by 2 dB or more, then the frequency bands are widely separated. In an embodiment, the length of the message is less than about ten milliseconds.

Any one or more of the above described methods may be used to determine whether frequency bands are widely spaced.

As discussed below, the number of signals within a message and the spacing of corresponding frequency bands may be varied to suit particular applications and environmental conditions.

Figure 2C:
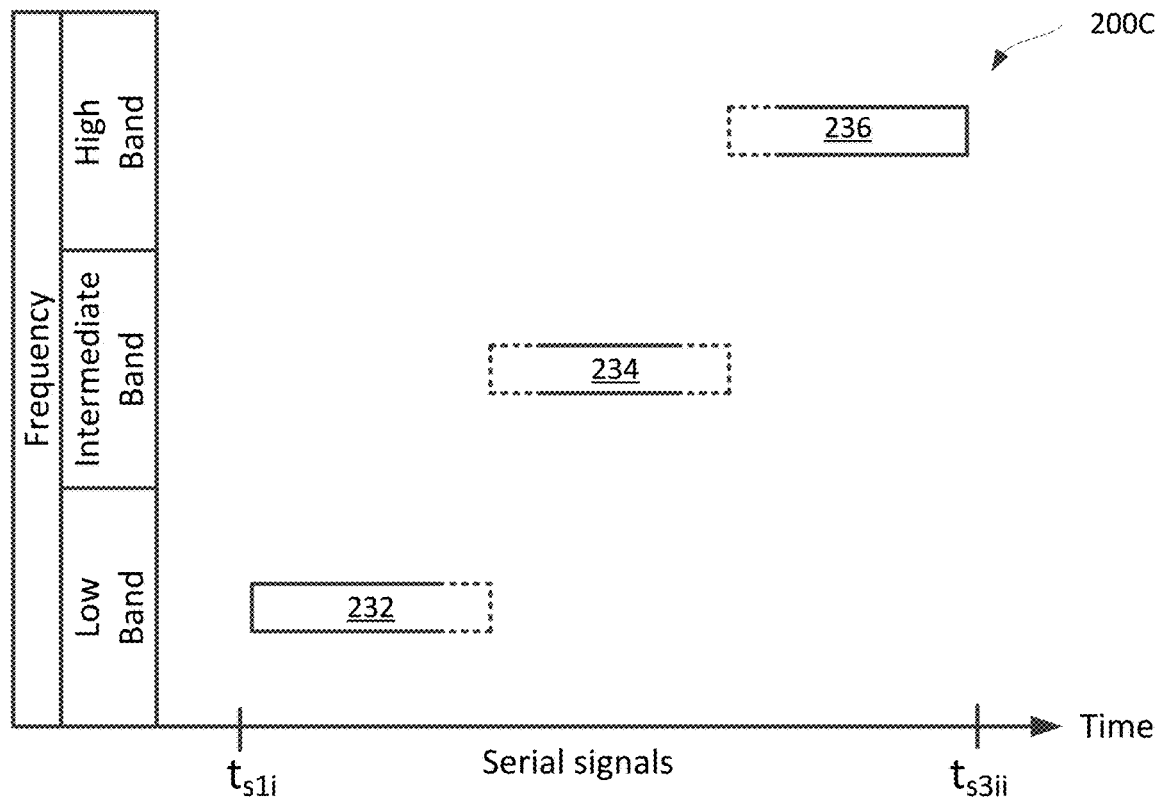

FIG. 2C shows a second multifrequency message 200C. In the embodiment shown, the message includes three signals which may abut in time, substantially abut in time (e.g., gap of less than about ten percent of one of, or of the shortest of, the signal lengths), or be spaced apart in time (e.g., a gap of about ten percent or more of one of, or of the shortest of, the signal lengths). A first signal 232 in a relatively low frequency band and beginning at time $t_{s1i}$ is followed in time by a second signal 234 in an intermediate frequency band. The second signal is followed in time by a third signal 236 in a high frequency band ending at time $t_{s3ii}$. The figure illustrates a multifrequency message with serial or serialized signals.

Figure 2D:
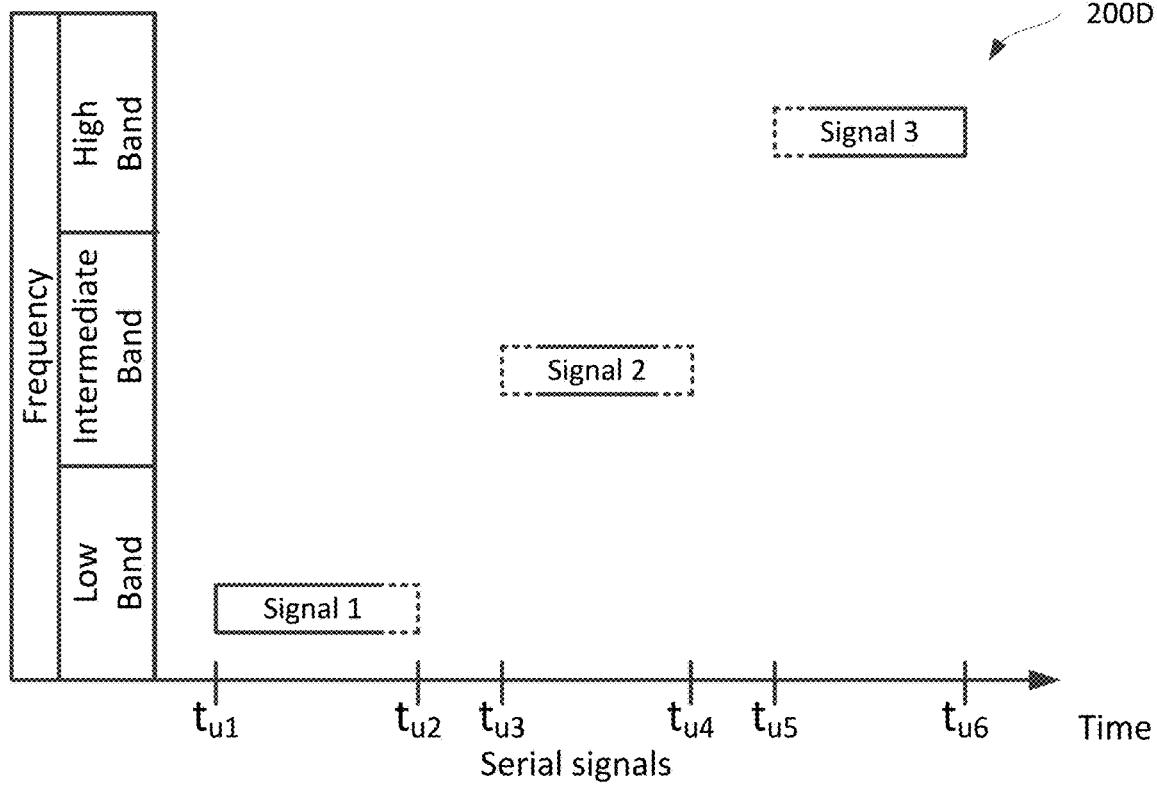

Unlike FIG. 2C, FIG. 2D shows a multifrequency message that is delivered in multiple pings 200D. In the embodiment shown, the message includes three signals which are not sent in a single ping message but rather in a multi-ping message using three consecutive message cycles. These message cycles may abut in time, substantially abut in time (e.g., gap of less than about ten percent of one of, or of the shortest of, the signal lengths), or be spaced apart in time (as shown, e.g., a gap of about ten percent or more of one of, or of the shortest of, the signal lengths). A first signal (Signal 1) in a relatively low frequency band and between times tu1 and tu2 corresponding to a first ping. A second signal (Signal 2) in an intermediate frequency band and between times tu3 and tu4 corresponding to a second ping. A third signal (Signal 3) in a relatively high frequency band and between times tu5 and tu6 corresponding to a third ping.

FIG. 2E shows a third multifrequency message 200E. In the embodiment shown, the message includes three signals that overlap in time with the earliest signal beginning at $t_a$ and the latest signal ending at $t_b$. Here, a first signal 242 in a relatively lower frequency band, a second signal 244 in an intermediate frequency band, and a third signal 246 in a high frequency band illustrate a multifrequency message with parallel signals.

Figure 3A:
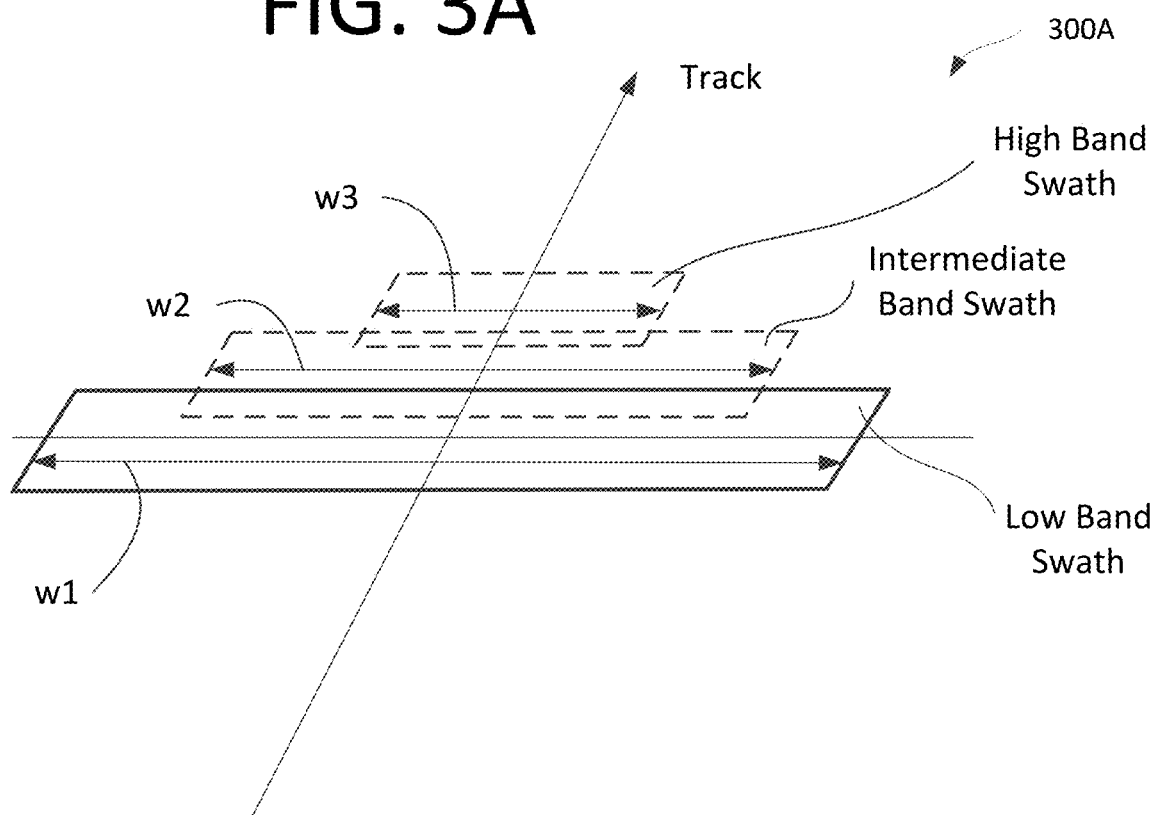
FIGS. 3A-D show swaths ensonified by multifrequency messages of the multibeam echo sounder of FIG. 1A.

FIG. 3A shows ensonification of a waterbody bottom by a multifrequency message with serialized signals 300A. Along a track of a multibeam echo sounder vehicle, three swaths are ensonified by the serial message incorporating three signals. Here, a low band swath is ensonified by a first signal in a lower frequency band, an intermediate band swath is ensonified by a second signal in an intermediate frequency band, and a third high band swath is ensonified by a third signal in a high band swath. The swaths are displaced along the track due to signals emitted sequentially in time and movement of the sonar with time along the survey track. Notably, the lower band swath has the greatest width w1 while the higher band swath has the least width w3 (w1>w2 and w2>w3) due to the (1/frequency$^2$) relationship between signal frequency and range. Further, swaths associated with higher bands may be narrower in the along-track direction than the swaths of lower bands.

Figure 3B:
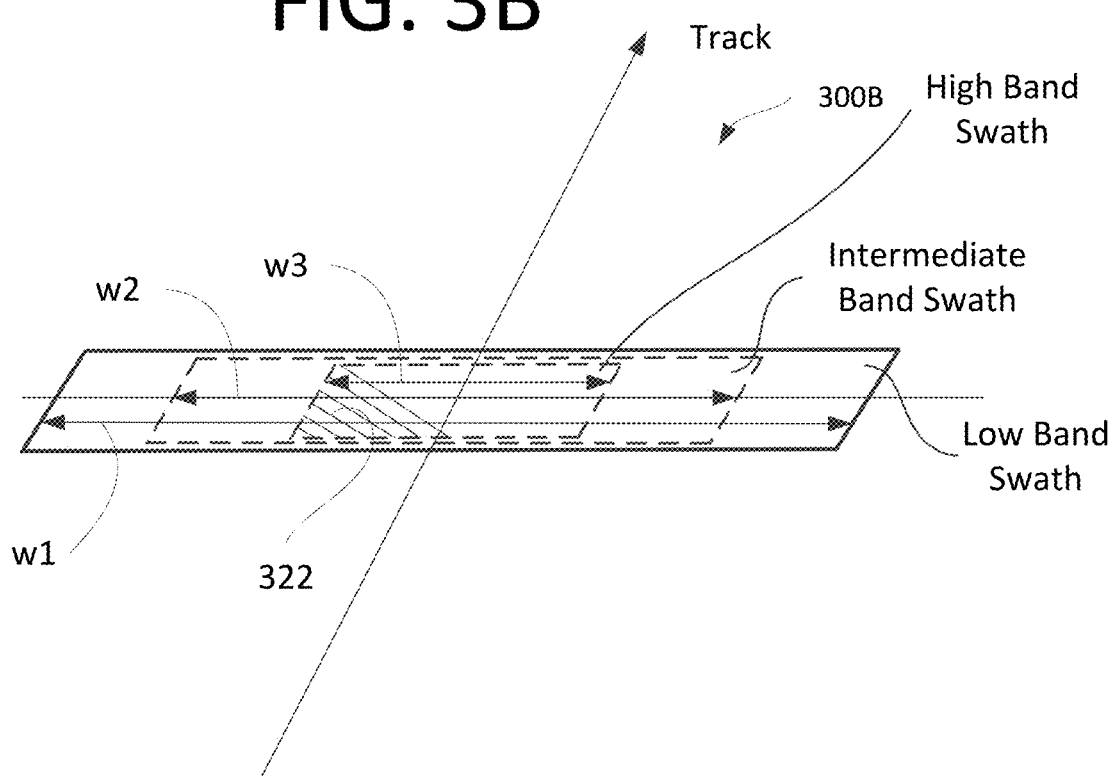

FIG. 3B shows ensonification of a waterbody bottom by a multifrequency message with parallel signals 300B. Along a track of a multibeam echo sounder platform, three swaths are ensonified by the message incorporating three signals in parallel. Here, a lower band swath is ensonified by a first signal in a lower frequency band, an intermediate band swath is ensonified by a second signal in an intermediate frequency band, and a third high band swath is ensonified by a third signal in a higher band swath. Because the message incorporates parallel signals, the swaths are not displaced along the track. Rather, the swaths are spatially superposed because the parallel signals are superimposed (overlap) in time.

Figure 3C:
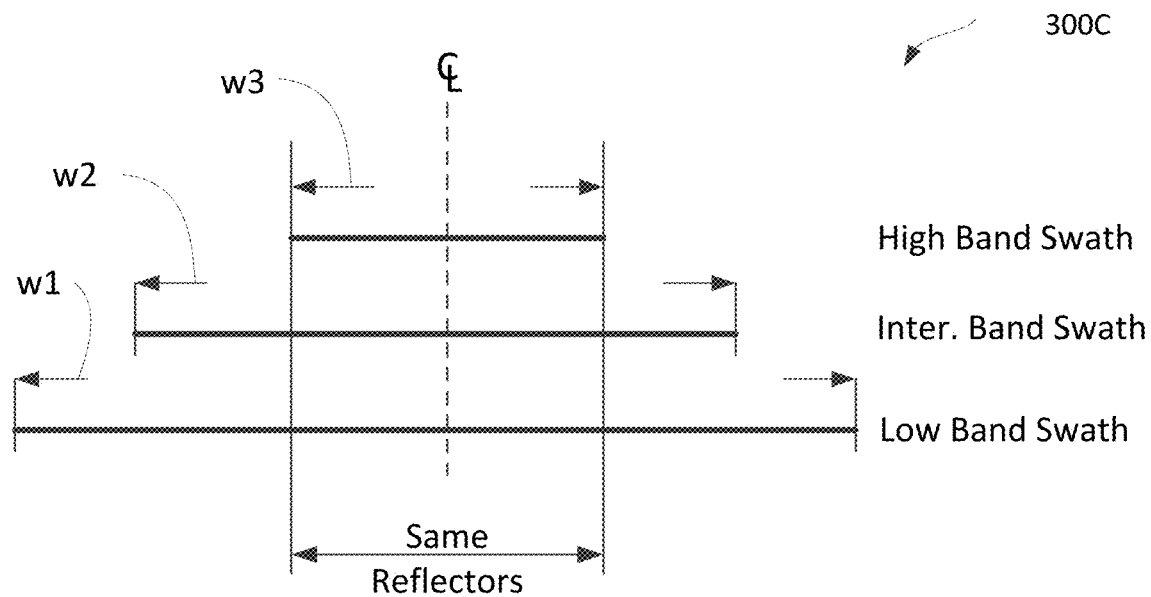

FIG. 3C illustrates returns from a section of the bottom of the water body that is shared by multiple swaths ensonified by a multifrequency message with parallel signals 300C. Here, the parallel signals of FIG. 3B ensonify lower, intermediate, and higher band swaths along respective swath widths w1, w2, w3. Because the parallel signal message avoids swath displacement due to vehicle motion, a swath area common to all of the swaths provides common echo generations for each of the signals. This common area is within an area 322 of the higher band swath.

Figure 3D:
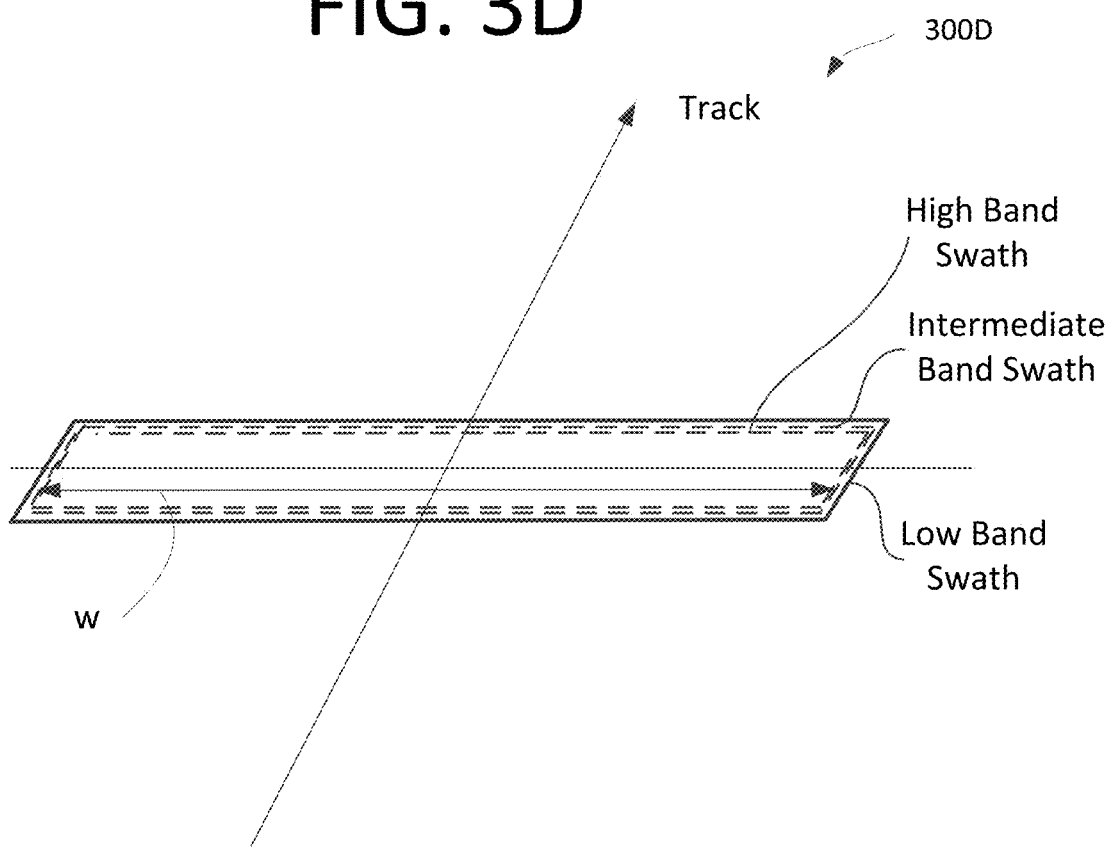

FIG. 3D illustrates colocated swaths ensonified by a multifrequency message with parallel signals 300D. Here, each of lower, intermediate, and higher band swaths share a common width w. Various configurations may produce colocated swaths.

In a first example, swaths may be colocated by selecting echo sounder receive beamforming 176 to a swath or sector width less than or equal to the higher frequency band swath width. In a second example, swaths may be colocated when grating lobes apparent at higher frequencies limit usable steering angles. In a third example, swaths may be colocated when operating in shallow water such that higher attenuation at higher frequencies does not limit detection range. The beamwidths associated with each frequency band typically vary with frequency with higher frequencies providing higher angular resolution. However, frequency dependence may be mitigated by normalizing to a common beamwidth by disabling selected array elements to vary apertures of the transmit and receive arrays.

FIG. 4 shows signal types and/or waveforms for use with various missions and/or applications of a multibeam echo sounder 400. As seen in the table, signal types include CW (continuous wave), FM (frequency modulation), OSS (orthogonal spread spectrum), PC (phase-coded), PT (pulse train), and LPI (low probability of intercept). Notably, FM includes linear FM or LFM.

The bathymetry and the forward-looking missions may use any of CW, FM, OSS, PC, PT, and LPI. The imaging mission may use any of CW, FM, OSS, and PC while the sub-bottom profiling mission may use any of CW, FM, PC, and PT. More selective missions are the water column mission that may use CW, FM, OSS, or PC, the bottom classification mission that may use CW or FM, and the Doppler mission that may use CW or PC.

Notably, as indicated above, a survey operation need not be limited to a single mission or application as a survey vehicle progresses along a track. Rather, various ones of the embodiments of the multibeam echo sounder of the present invention utilizing a single projector array and a single hydrophone array may be used to acquire and to process data for multiple missions simultaneously. The number of substantially simultaneous missions that may be carried out as a survey vehicle progresses along a track may equal or exceed the number of non-overlapping signal frequency bands accommodated by the multibeam echo sounder system 102.

The multimission surveys described below may utilize a multibeam echo sounder system 102, 100B-E having a single projector array and a single hydrophone array to substantially simultaneously acquire multimission survey data as a survey vehicle progresses along a track (e.g. single pass survey data). In some embodiments, substantially simultaneously takes into consideration motion of the survey vehicle and/or serial transmit message signals.

FIG. 5 shows multimission message content and message construction table for exemplary multimission surveys 500. As seen in the table, a multimission survey is carried out using a multimission message which may be constructed in a particular manner.

A first multimission survey includes a first bathymetry mission and a second bathymetry mission. Typically, intermediate bands are not used.

The first bathymetry mission utilizes a relatively low frequency band with a CW or FM signal. The second bathymetry mission utilizes a relatively high frequency band with a CW or FM signal. These signals may be serialized or paralleled in a single ping message. These signals may be sent in respective pings as a multi-ping message. Having read applicant's disclosure, skilled artisans will recognize the advantages of this multimission survey which, among other things, resolves long standing problems associated with choosing one or the other of a high frequency (relatively high resolution/relatively short range) survey or a low frequency (low resolution/long range) survey. In an embodiment, the frequency bands are widely spaced with band gaps therebetween.

A second multimission survey includes a first waterbody bottom or seafloor characterization mission and a second waterbody bottom or seafloor characterization mission. Typically, intermediate bands may be used.

The first waterbody bottom mission utilizes a relatively low frequency band with a CW signal. The second waterbody bottom mission utilizes a relatively high frequency band with a CW signal. These signals may be paralleled in a single ping message. These signals may be sent in respective pings in a multi-ping message. Having read applicant's disclosure, skilled artisans will recognize the advantages of this multimission survey which, among other things, resolves long standing problems associated with obtaining survey data sufficient for use in segmenting and/or classifying a waterbody bottom surface and/or waterbody bottom subsurface where the echo response varies with sonar frequency. Notably beneficial to bottom segmentation and/or bottom classification survey missions are parallel signals in a single ping message that provide for echoes at multiple frequencies from the same backscatterers (see e.g. FIGS. 3B-3D).

A third multimission survey includes a first waterbody bottom characterization or segmentation mission and a second bathymetry mission. Typically, intermediate bands may be used.

The first waterbody bottom characterization or segmentation mission utilizes a relatively lower frequency band with a CW signal or, in some embodiments, two or three CW signals. The second bathymetric mission utilizes a relatively higher frequency band with an FM signal. These signals may be serialized or paralleled in a single ping. These signals may be sent in respective pings in a multi-ping message. Having read applicant's disclosure, skilled artisans will recognize the advantages of this multimission survey which, among other things, resolves long standing problems associated obtaining survey data useful for both characterization or segmentation of the waterbody bottom and bathymetry in a single pass.

A fourth multimission survey includes a first Doppler navigation mission and a second multi-fan bathymetric mission. Typically, no intermediate bands are used. Multi-fan may refer to plural quasi-parallel fans or swaths including a first fan and one or more additional fans steered fore and/or aft of the first fan. For example, a multi-fan mission might use a central athwartship fan and quasi-parallel fans to either side of the athwartship fan.

The first Doppler navigation mission utilizes a relatively lower frequency band with a phase coded signal such as a Barker code. The second multi-fan bathymetric mission utilizes a relatively high frequency band with a spread spectrum signal such as orthogonal coded pulses OCP. These signals may be serialized in a single ping. Because OCP signals are distinguished by their code pattern, multiple ones of these coded signals may be used to ensonify respective parallel or somewhat parallel swaths in a fan-like arrangement. The returns from the OCP signals are distinguished using the code patterns. These signals may be serialized in a single ping or sent in respective pings in a multi-ping message. Having read applicant's disclosure, skilled artisans will recognize the advantages of this multimission survey which, among other things, resolves long standing problems associated with along track sounding density, multi-aspect multibeam surveys, and concurrent bathymetric and navigation operations.

A fifth multimission survey includes a first sub-bottom profiling mission and a second bathymetry mission. Typically, intermediate bands may be used.

The first waterbody bottom mission utilizes a relatively low frequency band with a CW signal. The second waterbody bottom mission utilizes a relatively high frequency band with a CW signal. These signals may be paralleled in a single ping message. These signals may be sent in respective pings in a multi-ping message. Having read applicant's disclosure, skilled artisans will recognize the advantages of this multimission survey which, among other things, resolves long standing problems associated with obtaining survey data sufficient for use in sub-bottom profiling and bathymetry. Notably beneficial to sub-bottom profiling is parallel transmission of both the sub-bottom profiling signal(s) and the bathymetry signal(s) such that the signals are returned from the same backscatterers (see e.g. FIGS. 3B-3D).

A sixth multimission survey includes a first water column characterization mission and a second water column characterization mission. Typically, intermediate bands may be used.

The first water column mission utilizes a relatively low frequency band with a CW or FM signal. The second water column mission utilizes a relatively high frequency band with a CW or FM signal. These signals may be serialized or paralleled in a single ping message. These signals may be sent in respective pings in a multi-ping message. Having read applicant's disclosure, skilled artisans will recognize the advantages of this multimission survey which, among other things, resolves long standing problems associated with obtaining water column data sufficient for use in segmenting and/or classifying water column scatterers where the echo response varies with sonar frequency. Notably beneficial to water column segmentation and/or water column classification missions are parallel signals in a single ping message that provide for echoes at multiple frequencies from the same backscatterers.

A seventh multimission survey includes a first water column characterization or segmentation mission and a second bathymetry mission. Typically, intermediate bands may be used.

The first water column characterization or segmentation mission utilizes a relatively lower frequency band with a CW or FM signal or, in some embodiments, two or three CW or FM signals. The second bathymetric mission utilizes a relatively higher frequency band with an FM signal. These signals may be serialized or paralleled in a single ping. These signals may be sent in respective pings in a multi-ping message. Having read applicant's disclosure, skilled artisans will recognize the advantages of this multimission survey which, among other things, resolves long standing problems associated obtaining survey data useful for both characterization or segmentation of the water column and bathymetry in a single pass.

FIGS. 6A-G show exemplary messages with particular signal frequencies for use in multimission surveys 600A-G.

FIG. 6A shows a first multimission survey including a first long range bathymetry mission and a second high resolution bathymetry mission 600A.

The first long range bathymetry mission utilizes a relatively lower frequency band with a CW or FM signal having a center frequency of about 200 kHz and respective bandwidths of about 5 to 30 kHz and about 30 to 60 kHz.

The second high resolution bathymetry mission utilizes a relatively higher frequency band with a CW or FM signal having a center frequency of about 700 kHz and respective bandwidths of about 20 to 60 kHz and about 20 to 60 kHz. These signals may be paralleled (as shown) in a single ping message. These signals may be sent in respective pings in a multi-ping message.

FIG. 6B shows a second multimission survey including three bottom characterization or segmentation missions 600B.

The first bottom characterization or segmentation mission utilizes a relatively low frequency band with a CW signal having a center frequency of about 50 kHz and a bandwidth of about 2 to 10 kHz.

The second bottom characterization or segmentation mission utilizes an intermediate frequency band with a CW signal having a center frequency of about 100 kHz and a bandwidth of about 2 to 10 kHz.

The third bottom characterization or segmentation mission utilizes a relatively higher frequency band with a CW signal having a center frequency of about 150 kHz and a bandwidth of about 2 to 10 kHz. These signals may be paralleled (as shown) in a single ping message. These signals may be sent in respective pings in a multi-ping message.

These center frequencies at 50, 100, 150 kHz may be shifted to avoid harmonics. For example, where the 50 kHz center frequency locates the center of a first frequency band, first harmonics may be avoided by shifting the 50 kHz center frequency by a frequency increment approximating the width of the first frequency band. For example, where the 150 kHz center frequency locates the center of a second frequency band, second harmonics may be avoided by shifting the 150 kHz center frequency by a frequency increment approximating the width of the second frequency band. As skilled artisans will understand, yet other similar changes to the above center frequencies may avoid harmonics.

Figure 6C:
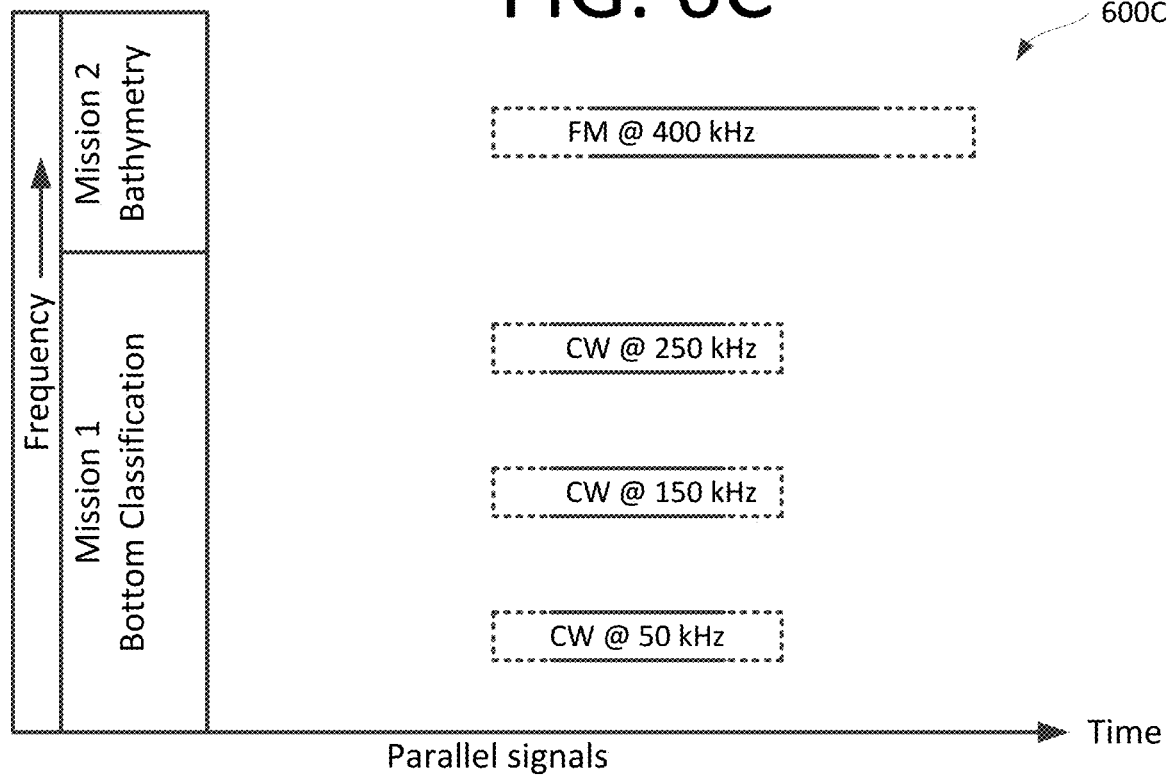

FIG. 6C shows a third multimission survey including a first bottom characterization or segmentation mission and a second bathymetry mission 600C.

The first bottom characterization or segmentation mission utilizes a relatively low frequency band with three CW signals having respective center frequencies of about 50, 150, 250 kHz. As described above, these center frequencies may be shifted to avoid harmonics. And where, as here, plural signals in respective bands are used to fulfill a single mission, the mission may be referred to as a multiband mission.

The second bathymetric mission utilizes a relatively higher frequency band with an FM signal having a center frequency of about 400 kHz and a bandwidth of about 30 to 60 kHz. These signals may be serialized or paralleled (as shown) in a single ping message. These signals may be sent in respective pings in a multi-ping message. Notably, the phrase "about . . . kHz" refers to manufacturing and operating tolerances associated with generation, transmission, reception, and/or deconstruction of signals by modern day sonar equipment used for bathymetry and/or bottom segmentation.

Figure 6D:
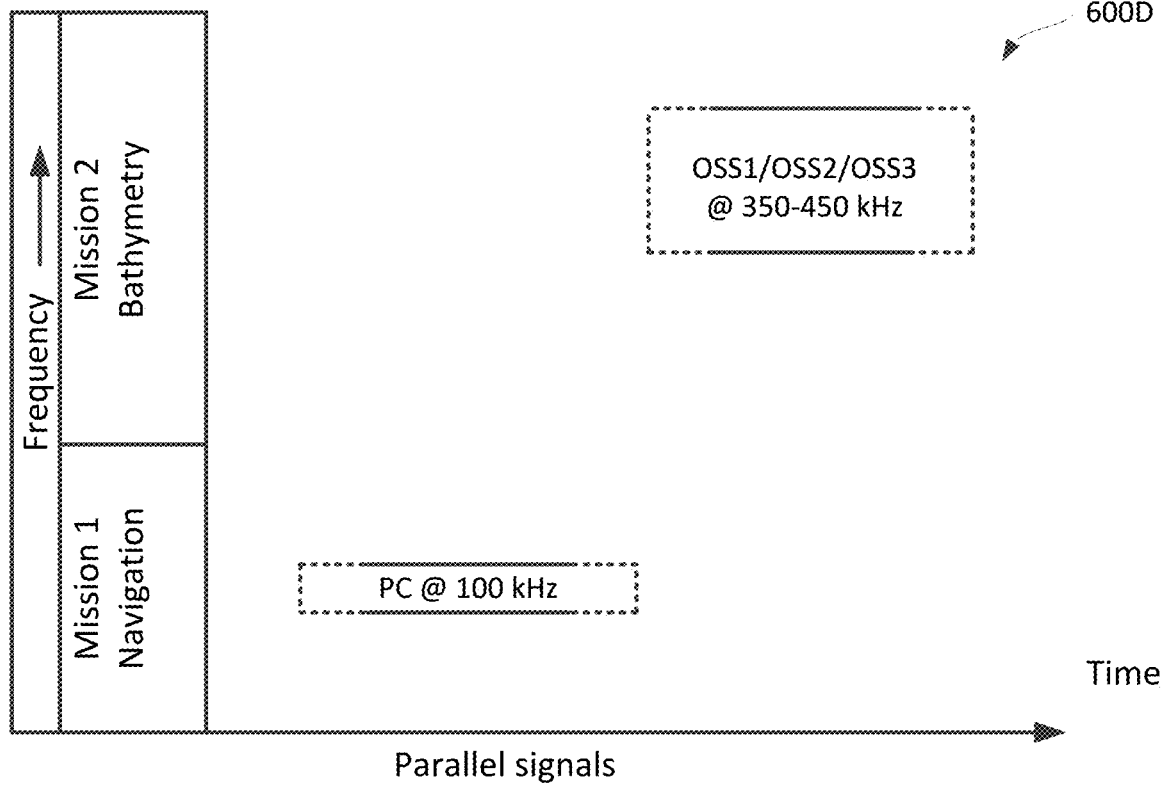

FIG. 6D shows a fourth multimission survey including a first navigation mission and a second bathymetry mission 600D.

The first navigation mission utilizes a relatively lower frequency band with a phase coded signal having a center frequency of about 100 kHz and a bandwidth of about 60 kHz.

The second bathymetry mission utilizes a relatively higher frequency band with three OSS signals having a center frequency of 400 kHz. The OSS signals may have similar bandwidths and occupy a common band having a bandwidth of about 100 kHz. Where, as here, there are multiple OSS signals occupying a common band, this may be referred to as a multisignal band and the signals within this band may be referred to as a package of signals.

These signals may be sent in a message having a combination parallel and serial format with the bathymetry mission signals sent in parallel and the navigation signal sent before or after the bathymetry signals.

Figure 6E:
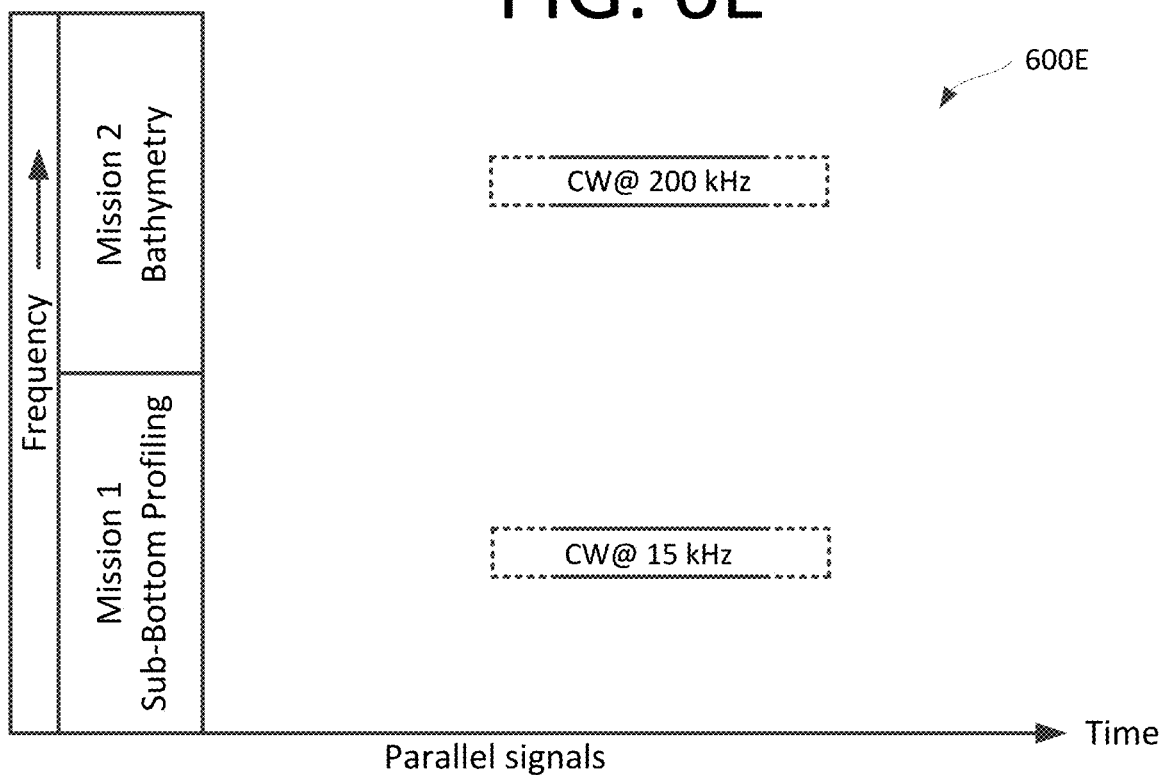

FIG. 6E shows a fifth multimission survey including a first sub-bottom profiling mission and a second bathymetry mission 600E.

The first sub-bottom profiling mission utilizes a relatively low frequency band with a CW signal having a center frequency of in a range of about 10 to 30 kHz, here 15 kHz, and a bandwidth of about 1 kHz.

The second bathymetry mission utilizes a relatively high frequency band with a CW signal having a center frequency of about 200 kHz and a bandwidth of about 20 to 60 kHz. These signals may be paralleled (as shown) in a single ping message. These signals may be sent in respective pings in a multi-ping message.

Figure 6F:
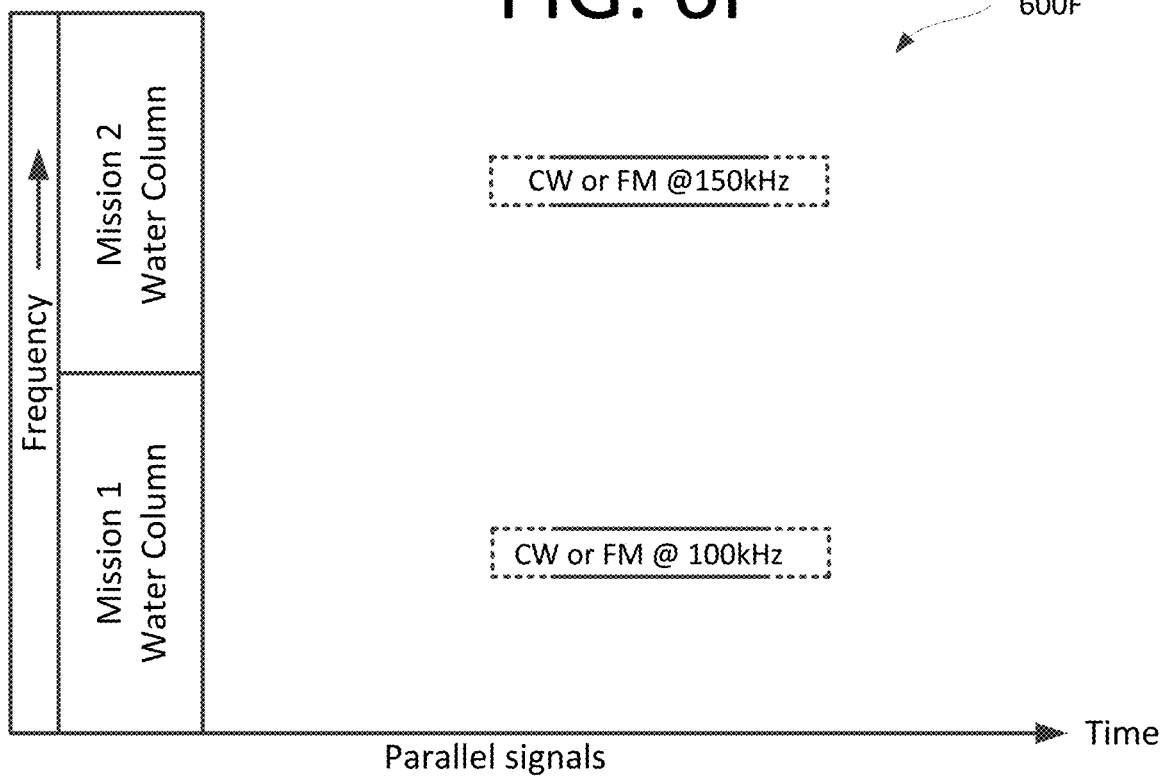

FIG. 6F shows a sixth multimission survey including a first water column mission and a second water column mission 600F.

The first water column mission utilizes a relatively low frequency band with a CW or FM signal having a center frequency of about 100 kHz and respective bandwidths of about 10 to 20 kHz and about 10 to 30 kHz.

The second water column mission utilizes a relatively higher frequency band with a CW or FM signal having a center frequency of about 150 kHz and respective bandwidths of about 10 to 20 kHz and about 10 to 30 kHz. These signals may be paralleled (as shown) in a single ping message. These signals may be sent in respective pings in a multi-ping message.

Figure 6G:
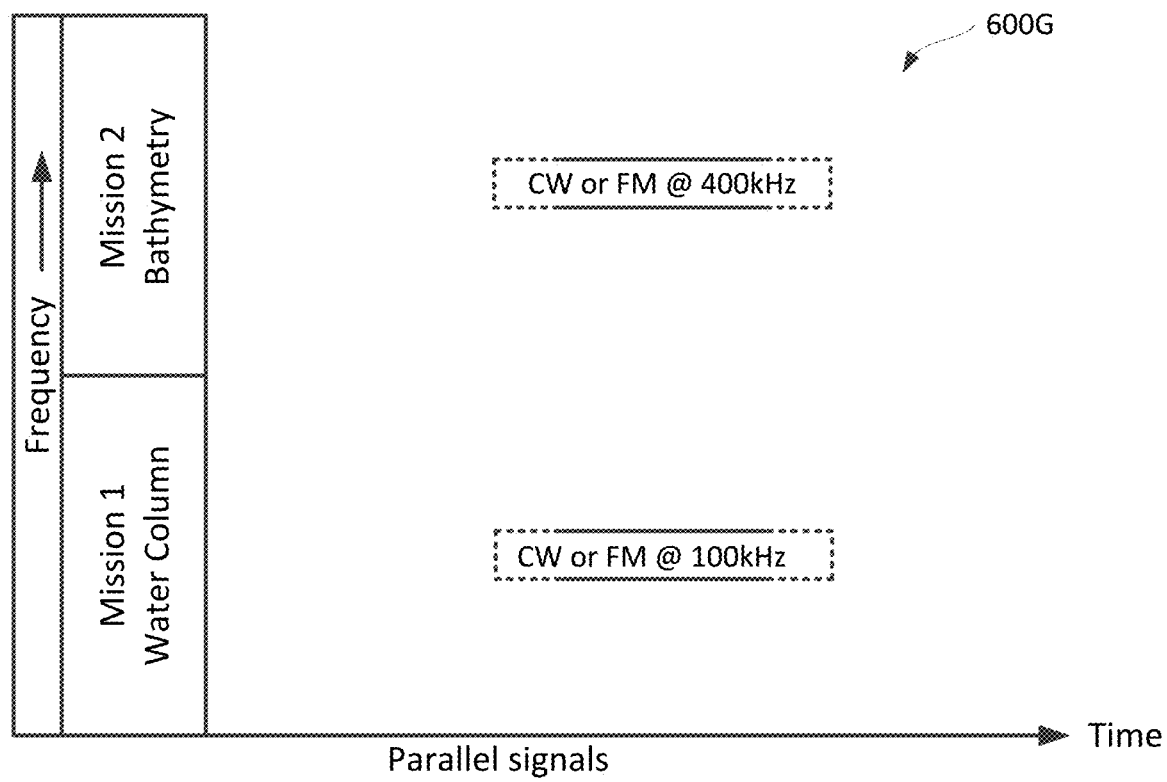

FIG. 6G shows a seventh multimission survey including a first water column mission and a second bathymetry mission 600G.

The first water column mission utilizes a relatively low frequency band with a CW or FM signal having a center frequency of about 100 kHz and respective bandwidths of about 10 to 30 kHz and about 30 to 60 kHz.

The second bathymetry mission utilizes a relatively higher frequency band with a CW or FM signal having a center frequency of about 400 kHz and respective bandwidths of about 20 to 60 kHz and about 30 to 60 kHz. These signals may be paralleled (as shown) in a single ping message. These signals may be sent in respective pings in a multi-ping message. Applicant notes the center frequencies of the signals mentioned in connection with FIGS. 6A-E are examples. In various embodiments, these center frequencies may vary in ranges of +/−5%, +/−10%, +/−25% and/or +/−50%. Applicant notes that the bandwidths of the signals mentioned in connection with FIGS. 6A-E are examples. In various embodiments, these bandwidths may vary in the ranges of +/−5%, +/−10%, +/−25% and/or +/−50%.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A sonar system comprising:
    a transceiver for connection to a plurality of projectors in a projector array and a plurality of hydrophones in a hydrophone array where the arrays are not arranged in plural rows and plural columns;
    a transceiver transmitter and the projector array configured to project an elongated transmit beam that simultaneously ensonifies an entire swath;
    a transceiver receiver and the hydrophone array configured to form elongated receive beams;
    wherein the system is configured to include a) consecutive transmissions including a first transmission and a second transmission that form first and second transmit beams where each of the transmit beams incorporates at least first and second signals in first and second non-overlapping frequency bands, b) the first transmit beam intersected by a first set of multiple receive beams and the second transmit beam intersected by a second set of multiple receive beams, and c) the receive beams receiving echoes from scattering centers ensonified by the transmit beams.

2. The sonar system of claim 1 wherein:
    the first transmission is a first ping;
    the second transmission is a second ping; and,
    a ping cycle includes a ping and reception of echoes from that ping.

3. The sonar system of claim 2 further comprising:
    a third consecutive transmission or ping resulting in a third transmit beam conveying a third signal in a third frequency band that does not overlap the first or the second frequency bands.

4. The sonar system of claim 3 wherein the second frequency band is higher in frequency than the first frequency band and the third frequency band is higher in frequency than the second frequency band.

5. The sonar system of claim 3 further including:
    the first ping used in the first ping cycle;
    the second ping used in the second ping cycle;
    the third ping used in the third ping cycle; and,
    the second ping cycle is between the first and third ping cycles, the end of the first ping cycle abutting the beginning of the second ping cycle and the beginning of the third ping cycle abutting the end of the second ping cycle.

6. The sonar system of claim 3 further including:
    the first ping used in the first ping cycle;
    the second ping used in the second ping cycle;
    the third ping used in the third ping cycle; and,
    the second ping cycle is between the first and third ping cycles, the end of the first ping cycle substantially abutting the beginning of the second ping cycle and the beginning of the third ping cycle substantially abutting the end of the second ping cycle.

7. The sonar system of claim 3 further including:
    the first ping used in the first ping cycle;
    the second ping used in the second ping cycle;
    the third ping used in the third ping cycle;
    the second ping cycle is between the first and third ping cycles;
    t1 is a time period required to transmit the first ping;
    the first and second ping cycles separated by a time t12 of less than about 10 percent of the time t1; and,
    the second and third ping cycles separated by a time t23 of less than about 10 percent of the time t1.

8. The sonar system of claim 3 further including:
    the first ping used in the first ping cycle;
    the second ping used in the second ping cycle;
    the third ping used in the third ping cycle;
    the second ping cycle is between the first and third ping cycles;
    t2 is a time period required to transmit a second ping;
    the first and second ping cycles separated by a time t12 of less than about 10 percent of the time t2; and,
    the second and third ping cycles separated by a time t23 of less than about 10 percent of the time t2.

9. The sonar system of claim 3 further including:
    the first ping used in the first ping cycle;
    the second ping used in the second ping cycle;
    the third ping used in the third ping cycle;
    the second ping cycle is between the first and third ping cycles;
    t3 is a time period required to transmit a second ping;
    the first and second ping cycles separated by a time t12 of less than about 10 percent of the time t3; and,
    the second and third ping cycles separated by a time t23 of less than about 10 percent of the time t3.

10. The sonar system of claim 3 further including:
    the first ping used in the first ping cycle;
    the second ping used in the second ping cycle;
    the third ping used in the third ping cycle;
    the second ping cycle is between the first and third ping cycles;
    $t_{sd}$ is a time period required to transmit the ping having the shortest duration;
    the first and second ping cycles separated by a time t12 of less than about 10 percent of the time $t_{sd}$; and,
    the second and third ping cycles separated by a time t23 of less than about 10 percent of the time $t_{sd}$.

11. The sonar system of claim 3, wherein the first ping is spaced apart in time from the second ping and the second ping is spaced apart in time from the third ping.

12. The sonar system of claim 3 further including:
    the first ping used in the first ping cycle;
    the second ping used in the second ping cycle;
    the third ping used in the third ping cycle;
    the second ping cycle is between the first and third ping cycles;
    t1 is a time period required to transmit the first ping;
    the first and second ping cycles separated by a time t12 of about 10 percent or more of the time t1; and,
    the second and third ping cycles separated by a time t23 of about 10 percent or more of the time t1.

13. The sonar system of claim 3 further including:
    the first ping used in the first ping cycle;
    the second ping used in the second ping cycle;
    the third ping used in the third ping cycle;
    the second ping cycle is between the first and third ping cycles; and,
    t2 is a time period required to transmit a second ping;

the first and second ping cycles separated by a time t12 of about 10 percent or more of the time t2; and, the second and third ping cycles separated by a time t23 of about 10 percent or more of the time t2.

14. The sonar system of claim 3 further including:
the first ping used in the first ping cycle;
the second ping used in the second ping cycle;
the third ping used in the third ping cycle;
the second ping cycle is between the first and third ping cycles;
t3 is a time period required to transmit a second ping;
the first and second ping cycles separated by a time t12 of about 10 percent or more of the time t3; and,
the second and third ping cycles separated by a time t23 of about 10 percent or more of the time t3.

15. The sonar system of claim 3 further including:
the first ping used in the first ping cycle;
the second ping used in the second ping cycle;
the third ping used in the third ping cycle;
the second ping cycle is between the first and third ping cycles;
$t_{sd}$ is a time period required to transmit the ping having the shortest duration;
the first and second ping cycles separated by a time t12 of about 10 percent or more of the time $t_{sd}$; and,
the second and third ping cycles separated by a time t23 of about 10 percent or more of the time $t_{sd}$.

16. The sonar system of claim 1 wherein:
the first transmission is transmission of a first message;
the second transmission is transmission of a second message; and,
a message cycle includes a transmitted message and reception of echoes from that message.

17. The sonar system of claim 16 further including:
a third consecutive transmission of a third message resulting in a third transmit beam conveying at least a third signal in a third frequency band that does not overlap the first or the second frequency band;
the first, second, and third messages used in respective first, second, and third message cycles; and,
the second message cycle is between the first and third cycles, the end of the first message cycle abutting the beginning of the second message cycle and the beginning of the third message cycle abutting the end of the second message cycle.

18. The sonar system of claim 16 further comprising:
the first transmission is transmission of a first signal;
the second transmission is transmission of a second signal; and,
a third consecutive transmission of a third message resulting in a third transmit beam conveying a third signal in a third frequency band that does not overlap the first or the second frequency band.

19. The sonar system of claim 18 wherein the second frequency band is higher in frequency than the first frequency band, and the third frequency band is higher in frequency than the second frequency band.

20. A sonar system for installation on a water going vehicle comprising:

a multibeam echosounder including a transmitter, a receiver, projectors, and hydrophones;
the projectors are not arranged in rows and columns;
the transmitter for transmitting a plurality of X signals in respective frequency bands that support X measurement functions;
the X signals driving each of the projectors and causing each projector to emit sound waves;
the sound waves focused on an elongated region such that scattering centers within the elongated region are ensonified;
the receiver and hydrophones forming multiple receive beams that intersect the elongated region at multiple locations; and,
the receiver acquiring echo data from the scattering centers at the intersections;
wherein frequency dependent characteristics of the ensonified scattering centers evident in the echoes enable the measurement functions.

21. A sonar system for installation on a water going vehicle comprising:
a multibeam echosounder including a transmitter, a receiver, projectors, and hydrophones;
the projectors are not arranged in rows and columns;
the transmitter for transmitting X signals driving each projector and causing each projector to emit sound waves;
the sound waves focused on an elongated region such that scattering centers within the elongated region are ensonified;
the receiver and hydrophones forming multiple receive beams that intersect the elongated region at multiple locations; and,
the receiver acquiring echo data from the scattering centers at the intersections;
wherein echo data in each frequency band is processed such that at each frequency, a frequency dependent scattering center characteristic enables a measurement function.

22. A sonar method comprising the steps of:
on a water going vehicle, providing a sonar including a transceiver, a plurality of transducers in a projector array, and a plurality of transducers in a hydrophone array wherein the projectors in the projector array are not arranged in rows and columns;
configuring the transceiver, projector array, and hydrophone array to form intersecting transmit and receive beams;
transmitting a first signal in a first frequency band;
collecting echo data via first receive beams from scattering centers ensonified by the first signal;
transmitting a second signal in a second frequency band that does not overlap the first frequency band;
collecting echo data via second receive beams from scattering centers ensonified by the second signal; and,
from the echo data resulting from the first and second signals, performing one or more measurement functions that indicate one or more frequency dependent characteristics of the ensonified scattering centers.

* * * * *